US012752630B2

(12) United States Patent
Foley et al.

(10) Patent No.: US 12,752,630 B2
(45) Date of Patent: Oct. 6, 2026

(54) MODULAR SYSTEM FOR DYNAMIC TOW AND REGENERATIVE BRAKING OF A TRAILER

(71) Applicant: Range Energy Inc., Mountain View, CA (US)

(72) Inventors: Kyle Foley, Half Moon Bay, CA (US); Bryan Booth, San Mateo, CA (US); Collin MacGregor, Redwood City, CA (US); Ryan Flatland, San Carlos, CA (US); Brinton Mooberry, San Mateo, CA (US); Theodore DeGuzman, Palo Alto, CA (US); Ali Javidan, Sunnyvale, CA (US); Robert Alan Ng, Los Altos, CA (US); John Philippe Furtado, San Francisco, CA (US); Nuno Goncalves, Mountain View, CA (US); Kyle Pollard, Kirkland, WA (US)

(73) Assignee: Range Energy Inc., Mountain View, CA (US)

( * ) Notice: Subject to any disclaimer, the term of this patent is extended or adjusted under 35 U.S.C. 154(b) by 146 days.

(21) Appl. No.: 18/941,813

(22) Filed: Nov. 8, 2024

(65) Prior Publication Data

US 2025/0135899 A1 May 1, 2025

Related U.S. Application Data

(63) Continuation-in-part of application No. 18/388,474, filed on Nov. 9, 2023, now Pat. No. 12,162,363,
(Continued)

(51) Int. Cl.
*B60L 7/26* (2006.01)
*B60R 16/033* (2006.01)

(52) U.S. Cl.
CPC .............. *B60L 7/26* (2013.01); *B60R 16/033* (2013.01); *B60L 2200/28* (2013.01); *B60L 2240/461* (2013.01)

(58) Field of Classification Search
CPC ........................... B60R 16/033; B60L 2200/28
(Continued)

(56) References Cited

U.S. PATENT DOCUMENTS 6,668,225 B2 12/2003 Oh et al.
9,422,015 B1 8/2016 Fraley et al.
(Continued)

FOREIGN PATENT DOCUMENTS

CA 3238063 A1 12/2010
CA 3035952 A1 * 9/2020 .......... B60L 15/2081
(Continued)

OTHER PUBLICATIONS

International Search Report for International Application No. PCT/US24/55163 mailed on May 2, 2025; 21 pages.
(Continued)

*Primary Examiner* — Jacob S. Scott
*Assistant Examiner* — Michael E Butler
(74) *Attorney, Agent, or Firm* — Polygon IP, LLP

(57) ABSTRACT

One variation of a system includes a modular kit. The modular kit includes: a driven axle configured to install on a bogie chassis supporting a trailer chassis of a trailer; a motor coupled to the driven axle; a battery assembly; a set of electrical cables; and a cable carrier. The battery assembly includes a set of retention features configured to transiently engage a set of engagement features on the trailer chassis to couple the battery assembly to the trailer chassis and is configured to: supply electrical energy to the motor to drive the driven axle; and receive electrical energy from the motor to regeneratively brake the driven axle. The set of electrical
(Continued)

cables are configured to electrically couple the motor and the battery assembly. The cable carrier is configured to: locate between the bogie chassis and the battery assembly; and support the set of electrical cables over a range of longitudinal positions.

20 Claims, 12 Drawing Sheets

Related U.S. Application Data which is a continuation-in-part of application No. 18/238,408, filed on Aug. 25, 2023, now Pat. No. 11,965,795, and a continuation-in-part of application No. 18/238,405, filed on Aug. 25, 2023, and a continuation-in-part of application No. 18/238,415, filed on Aug. 25, 2023.

(60) Provisional application No. 63/431,273, filed on Dec. 8, 2022, provisional application No. 63/420,469, filed on Oct. 28, 2022, provisional application No. 63/401,030, filed on Aug. 25, 2022.

(58) Field of Classification Search
USPC .......................................................... 700/22
See application file for complete search history.

(56) References Cited

U.S. PATENT DOCUMENTS

| | | | |
|---|---|---|---|
| 9,425,671 | B1 | 8/2016 | Van Meveren et al. |
| 9,545,914 | B2 | 1/2017 | Laing et al. |
| 2007/0260386 | A1 | 11/2007 | Tandy, Jr. et al. |
| 2010/0070149 | A1 | 3/2010 | Fry et al. |
| 2013/0079979 | A1 | 3/2013 | Sheidler et al. |
| 2015/0081184 | A1 | 3/2015 | Braunberger |
| 2016/0176403 | A1 | 6/2016 | Weston |
| 2020/0233410 | A1* | 7/2020 | Burns .................... B60L 50/66 |
| 2020/0238990 | A1* | 7/2020 | Ma ....................... B60W 30/18 |
| 2020/0335840 | A1 | 10/2020 | Sloan et al. |
| 2022/0169252 | A1* | 6/2022 | Yhr ......................... B60L 7/10 |
| 2022/0410990 | A1 | 12/2022 | Rust |
| 2023/0075054 | A1* | 3/2023 | Haas ...................... B60L 58/40 |
| 2023/0182613 | A1 | 6/2023 | Jung et al. |

FOREIGN PATENT DOCUMENTS

| | | | | |
|---|---|---|---|---|
| DE | 102008004160 | B4 | 8/2009 | |
| DE | 102009032754 | A1 | 1/2011 | |
| DE | 202012001437 | U1 | 3/2012 | |
| DE | 102010062979 | A1 | 6/2012 | |
| DE | 102012107648 | B4 | 5/2014 | |
| EP | 2394890 | A1 | 12/2011 | |
| EP | 3858714 | A1 * | 8/2021 | .......... B62D 53/067 |
| FR | 2854122 | A1 | 10/2004 | |
| IE | 20090721 | A1 * | 5/2010 | .......... B62D 53/068 |
| JP | 2008012938 | A | 1/2008 | |
| JP | 2011050206 | A | 3/2011 | |
| JP | 2012126250 | A | 7/2012 | |
| JP | 2012126304 | A | 7/2012 | |
| NL | 1030159 | C1 | 4/2007 | |
| WO | 2010146497 | A1 | 12/2010 | |

OTHER PUBLICATIONS

Gage et al.; Low-Emission Range Extender for Electric Vehicles; https://www.semanticscholar.org/paper/Low-Emission-Range-Extender-for-Electric-Vehicles-Gage-Bogdanoff/1a0223890746a141457a458cf7e98690501cb789; downloaded Apr. 15, 2026; pp. 1-10.

* cited by examiner

MODULAR SYSTEM FOR DYNAMIC TOW AND REGENERATIVE BRAKING OF A TRAILER

CROSS-REFERENCE TO RELATED APPLICATIONS

This Application is a continuation-in-part application of U.S. patent application Ser. No. 18/388,474, filed on 9 Nov. 2023, which is a continuation-in-part application of U.S. patent application Ser. No. 18/238,405, filed on 25 Aug. 2023, Ser. No. 18/238,408, filed on 25 Aug. 2023, and Ser. No. 18/238,415, filed on 25 Aug. 2023, which claim the benefit of U.S. Provisional Application No. 63/401,030, filed on 25 Aug. 2022, 63/420,469, filed on 28 Oct. 2022, and 63/431,273, filed on 8 Dec. 2022, each of which is incorporated in its entirety by this reference.

TECHNICAL FIELD

This invention relates generally to the field of overland trucking and more specifically to a new and useful system for dynamic tow and regenerative braking in the field of overland trucking.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1A:
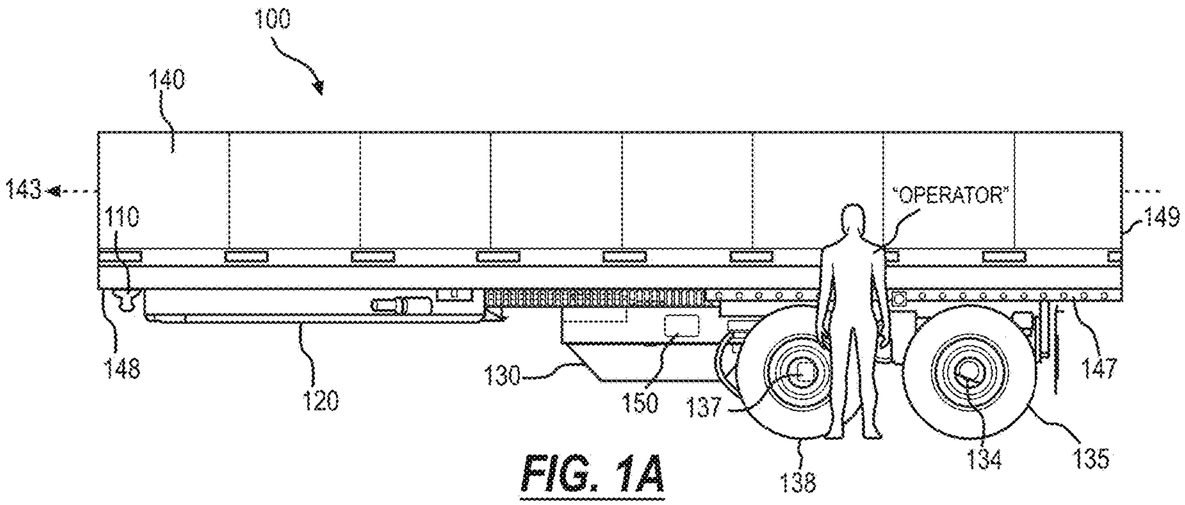
FIGS. 1A, 1B, and 1C is a schematic representation of a system.
Figure 1B:
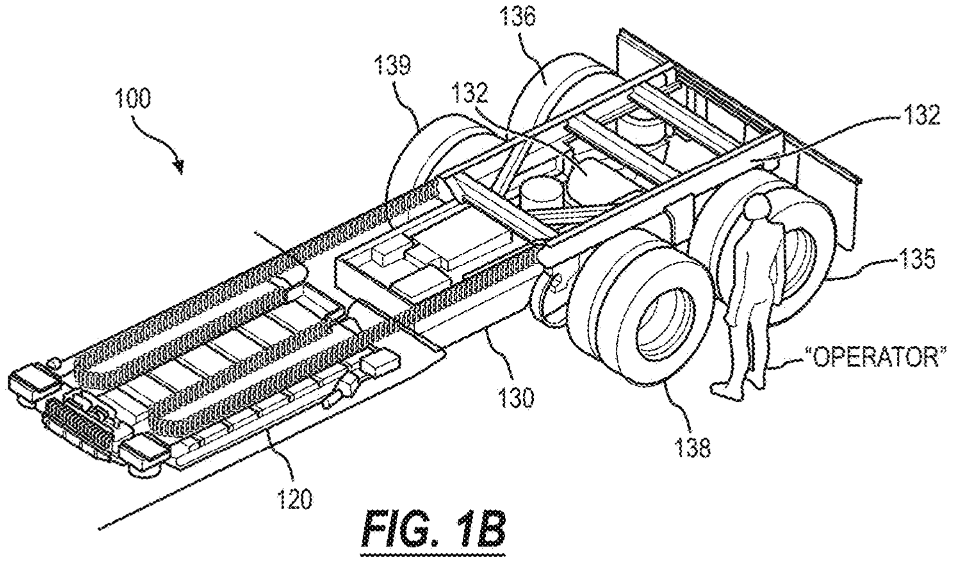
Figure 1C:
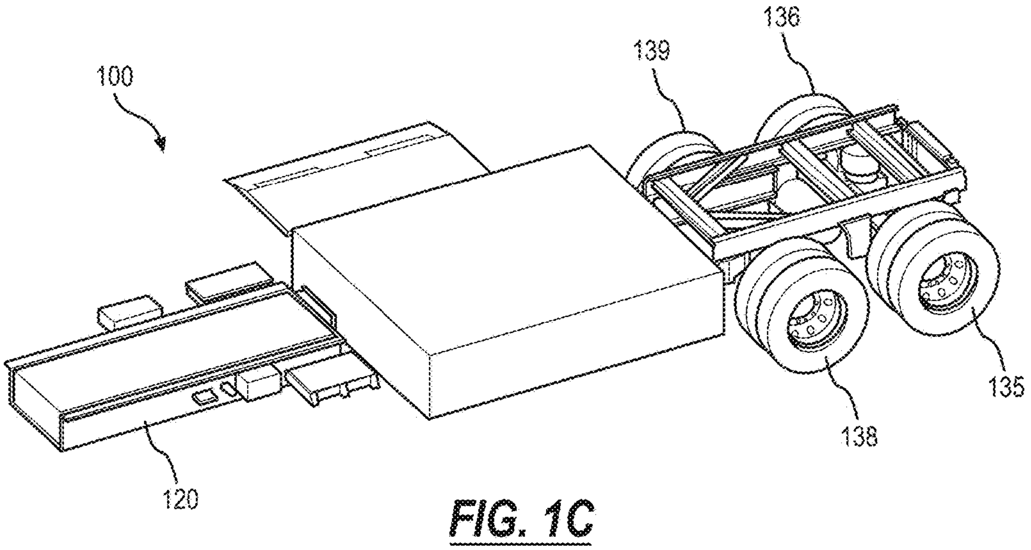

As shown in FIG. 1, a system 100 for tow control of a trailer 140 includes: a bogie 130; a battery assembly 120; and a controller 150. The bogie 130 includes: a bogie chassis 132 configured to transiently install on a left rail 147 and a right rail 147 of the trailer 140 over a range of longitudinal positions; a first set of latches 133 configured to transiently engage a first subset of engagement features 144, in a first array of engagement features 144 on the left rail 147 and in a second array of engagement features 144 on the right rail 147, to retain the bogie 130 below a floor 146 of the trailer 140; a driven axle 137 suspended from the bogie chassis 132; and a motor 131 coupled to the driven axle 137. The battery assembly 120 includes a second set of latches 133 configured to transiently engage a second subset of engagement features 144, in the first array of engagement features 144 on the left rail 147 and in the second array of engagement features 144 on the right rail 147, to retain the first battery assembly 120 below the floor 146 of the trailer 140. The controller 150 is configured to: trigger the first battery assembly 120 to supply electrical energy to the motor 131 to output torque to the driven axle 137 in a tow mode; and trigger the motor 131 to supply electrical energy to the first battery assembly 120 to regeneratively brake the driven axle 137 and charge the first battery assembly 120 in a regenerative braking mode.

In one variation, the system 100 includes: a trailer 140; a bogie 130; and a battery assembly 120. In this variation, the trailer 140 includes: a floor; a left rail 147 coupled to the floor, extending parallel to and laterally offset from a longitudinal centerline of the trailer 140, and defining a first array of engagement features 144 distributed along the left rail 147 and longitudinally offset by a pitch distance; and a right rail 147, coupled to the floor, extending parallel to and laterally offset from the longitudinal centerline of the trailer 140 opposite the left rail 147, and defining a second array of engagement features 144 distributed along the right rail 147 and longitudinally offset by the pitch distance.

In this variation, the bogie 130 further includes: a bogie chassis 132; a first set of latches 133 configured to transiently engage a first subset of engagement features 144, in the first array of engagement features 144 and in the second array of engagement features 144, to retain the bogie 130 below the floor 146 of the trailer 140; a driven axle 137 suspended from the bogie chassis 132; and a motor 131 coupled to the driven axle 137. The battery assembly 120 includes a second set of latches 133 configured to: transiently engage a second subset of engagement features 144, in the first array of engagement features 144 and in the second array of engagement features 144, to retain the battery assembly 120 below the floor 146 of the trailer 140 adjacent the bogie 130; and supply electrical energy to the motor 131.

In another variation, the system 100 includes a bogie 130 and a battery assembly 120. The bogie 130 includes: a bogie chassis 132 configured to transiently install on the trailer 140 over a range of longitudinal positions; a first set of latches 133 configured to transiently engage a first subset of engagement features 144, in a first array of engagement features 144 on a left rail 147 of the trailer 140 and in a second array of engagement features 144 on the right rail 147 of the trailer 140, to retain the bogie 130 below a floor 146 of the trailer 140; a driven axle 137 suspended from the bogie chassis 132; and a motor 131 coupled to the driven axle 137 and configured to output torque to the driven axle 137 and regeneratively brake the driven axle 137. The battery assembly 120: includes a second set of latches 133 configured to transiently engage a second subset of engagement features 144, in the first array of engagement features 144 and in the second array of engagement features 144, to retain the battery assembly 120 below the floor 146 of the trailer 140 adjacent the bogie 130; and is configured to receive electrical energy from the motor 131 to recharge the battery assembly 120.

2. Applications

Generally, the system 100 includes: a bogie 130 that transiently (e.g., temporarily) installs on a floor 146 of a trailer 140 over a range of longitudinal positions over time, includes a driven axle 137 and a motor 131 coupled to the driven axle 137; a battery assembly 120 or a set of modular batteries 120 that enable a user to selectively adjust the battery capacity as a function of a predicted distance traveled by the trailer 140, a weight distribution of the trailer 140, a type of the trailer 140 (e.g., a dry van trailer 140, a refrigerated trailer 140), and/or a length of the trailer 140 (e.g., 20 feet, 40 feet, 48 feet, 53 feet, 60 feet); and a controller 150 configured to trigger the battery assembly 120 to supply electrical energy to the motor 131 to output torque to the driven axle 137 in a tow mode and trigger the motor 131 to supply electrical energy to the battery assembly 120 to regeneratively brake the driven axle 137 and charge the battery assembly 120 in a regenerative braking mode.

In particular, the bogie 130 includes a set of latches 133—such as solenoids, manual latches, pneumatic latches, or other electromechanical latches—to configured to transiently engage corresponding engagement features 144 on the left rail 147 and the right rail 147, to retain the bogie 130 below the floor 146 of the trailer 140. Each latch is operable in an engaged position (e.g., a closed position) to engage and retain a corresponding engagement feature to couple the bogie 130 to the floor 146 of the trailer 140 and thereby, prevent unauthorized access and/or removal of the bogie 130 from the trailer 140. Further, each latch is operable in a disengaged position (e.g., an open position) to disengage from a corresponding engagement feature and decouple the bogie 130 from the floor 146 of the trailer 140 and thereby, enable a user to manually adjust the position of the bogie 130 or remove and service the bogie 130 (e.g., clean the bogie 130, replace the motor 131, clean the driven wheels) without additional tools.

Additionally, the system 100 is configured to dynamically tow and regeneratively brake a trailer 140 (e.g., a towed vehicle) by: selectively entering an operational mode (e.g., a tow mode, a regenerative braking mode, a service mode); selectively operating the motor 131 of the bogie 130 in a tow mode to output torque to the driven axle 137; detecting a direction of motion of the trailer 140; accessing signals output by sensors coupled to an emergency brake line (e.g., a supply brake line, a spring-brake relay), suspension systems, and wheels of the trailer 140; identify errors (e.g., sensor failure, pneumatic or mechanical brake failure of the trailer 140); interpret air pressures and a load distribution on the driven axle 137 via these sensors; leverage these air pressures and load distribution to automatically transition from the tow mode to the regenerative braking mode and vice versa; and, in a regenerative braking mode, trigger the motor 131 to selectively increase or decrease the supply of an electrical energy flux to the battery assembly 120 to regeneratively brake the driven axle 137 and charge the battery assembly 120 based on these signals and identified errors.

2.1 Tow Mode

In tow mode, the controller 150 can detect conditions of the trailer 140 such as: a direction of motion of the trailer 140 (e.g., a forward direction, a reverse direction); a tractor-trailer (e.g., a steering angle); a speed of the trailer 140; an incline angle of the trailer 140 (e.g., a grade of a ground surface); a location of the trailer 140; forces applied to the kingpin 110 (e.g., lateral forces, longitudinal forces, vertical forces, total forces); and/or a charge state of each battery assembly 120 coupled to the trailer 140 (e.g., a status, a level, a percentage). The controller 150 can then: calculate a target preload force proportional to and/or inversely proportional to the condition of the trailer 140; and trigger the battery assembly 120 to supply electrical energy to the motor 131 to increase torque output and/or reduce torque output to the driven axle 137 in the direction of motion of the trailer 140 to decrease a difference between the target preload force and a total force applied to the kingpin (e.g., an actual force) to control the trailer 140 in conjunction with the tow vehicle.

2.2 Regenerative Braking Mode

The controller 150 can leverage signals output by a pressure sensor 115 coupled to a spring-brake relay of a tow vehicle to automatically transition from the tow mode to the regenerative braking mode and vice versa.

Furthermore, the controller 150 can leverage air signals received from the tow vehicle via the gladhand, the target preload force, and signals output from a set of wheel speed sensors to automatically apply a proportion of braking force to the driven axle 137 from the pneumatic or mechanical brake system of the trailer 140 and/or regeneratively brake the driven axle 137, and thereby, maintain traction between the driven wheels of the trailer 140 and a ground surface.

Therefore, the controller 150 can leverage the dynamic target preload force, torque output, and regenerative braking: to prevent a jackknife event between the tow vehicle and the trailer 140 (e.g., tow vehicle brakes to a stop and the trailer 140 continues to move toward and push the tow vehicle or torque applied to the kingpin); to prevent wheel lockup of the trailer 140; to maintain traction between the driven wheels of the trailer 140 and a ground surface; to reduce emissions by the tow vehicle; to decrease fuel consumption by the tow vehicle; to extend the life of each battery assembly 120 coupled to the trailer 140; and to enable a driver of the tow vehicle to apply minimal to no brake force to the trailer 140.

2.3 Example Configurations

Figure 4A:
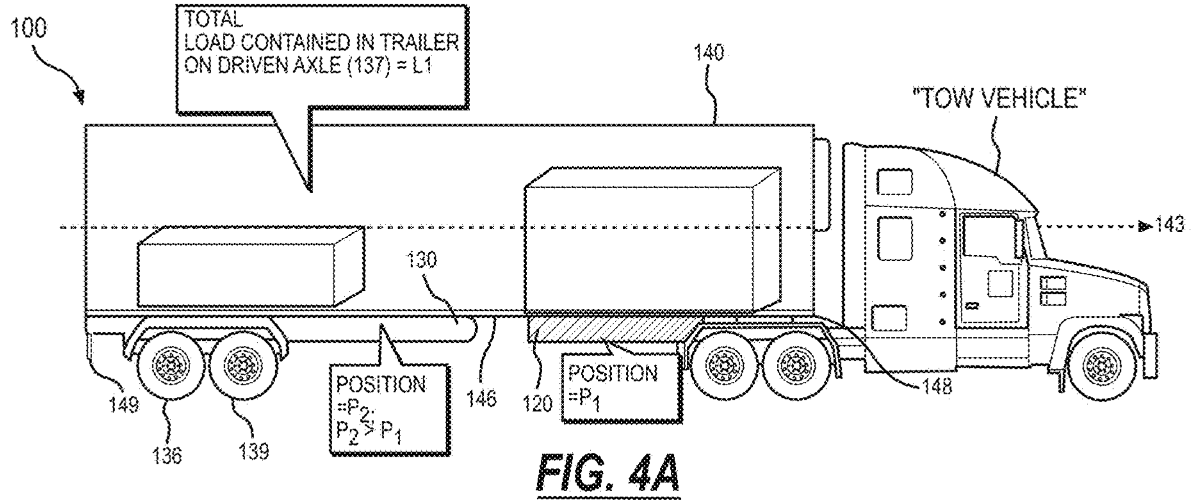
FIGS. 4A, 4B, and 4C are schematic representations of one variation of the system.
Figure 4B:
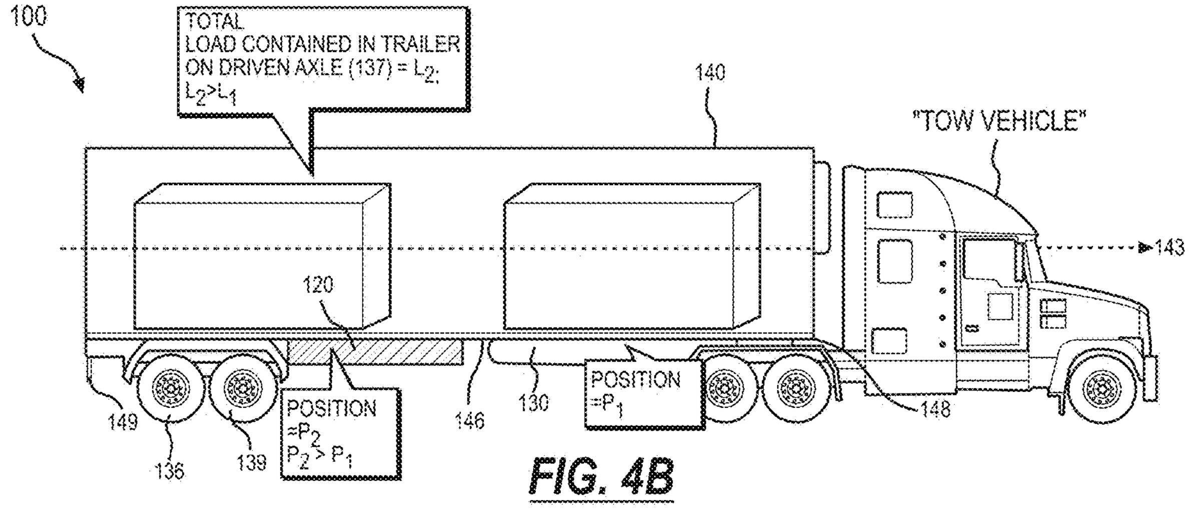
Figure 4C:
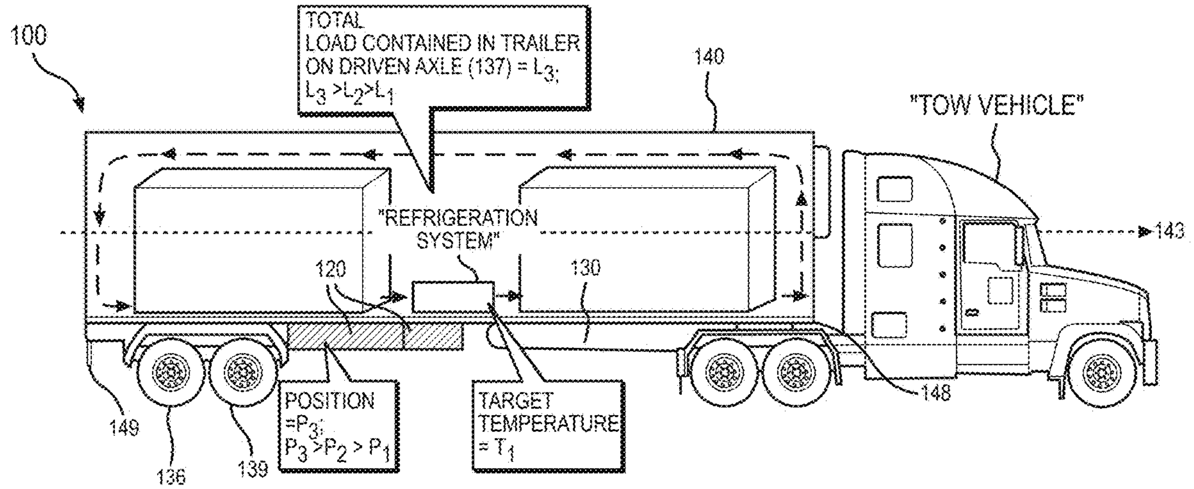

Generally, a trailer 140 includes a left rail 147 and a right rail 147 that couple to a floor 146 of the trailer 140. The left rail 147 and the right rail 147 run along a longitudinal axis 143 of the trailer 140, extending parallel to and laterally offset from a longitudinal centerline, such that when coupled to a bogie 130, a user (e.g., an operator, a driver, a technician) or a machine may manipulate the bogie 130 along the left rail 147 and the right rail 147 to a target position (e.g., a longitudinal position) below the floor 146 of the trailer 140 and thus, transiently install the bogie 130 below the floor 146 of the trailer 140 over a range of longitudinal positions. More specifically, the user or machine may manipulate the bogie 130 and a battery assembly 120, electrically coupled to the bogie 130, along the left rail 147 and the right rail 147 to a target position as a function of weight distribution (e.g., a payload) of the trailer 140, as shown in FIGS. 4A, 4B, and 4C.

For example, an operator may install the bogie 130 and the battery assembly 120 to target positions to support (e.g., balance) a weight distribution of the trailer 140 on the driven axle 137. In this example, the user may install the battery assembly 120 on the left rail 147 and the right rail 147 (e.g., via latches 133) and arrange the battery assembly 120 in a first position on a proximal end of the trailer 140 (e.g., facing a hitch of a tow vehicle). Then, the user may install the bogie 130 on the left rail 147 and the right rail 147 (e.g., via latches 133) and manipulate the bogie 130 along the longitudinal axis 143 of the trailer 140 to arrange the bogie 130 in an opposite position on the distal end of the trailer 140 within a threshold distance of the battery assembly 120 to balance a weight of the trailer 140, containing a first load, on the driven axle 137.

Alternatively, in this example, the user may install the bogie 130 on the left rail 147 and the right rail 147 (e.g., via latches 133) and manipulate the bogie 130 along the longitudinal axis 143 of the trailer 140 to arrange the bogie 130 in a first position on the proximal end of the trailer 140 (e.g., facing a hitch of a tow vehicle). Then, the user may install the battery assembly 120 on the left rail 147 and the right rail 147 (e.g., via latches 133) and manipulate the bogie 130 along the longitudinal axis 143 of the trailer 140 to arrange the battery assembly 120 in an opposite position on the distal end of the trailer 140 within a threshold distance of the bogie 130 to balance a weight of the trailer 140, containing a load different from the first load, on the driven axle 137.

3. Trailer

The trailer 140 includes a floor 146 and a set of rails 147 coupled to the floor 146. The left rail 147 and the right rail 147 run along a longitudinal axis 143 of the trailer 140, extending parallel to and laterally offset from a longitudinal centerline, to form a channel below the floor 146 of the trailer.

In one implementation the trailer 140 includes: a floor 146; a left rail 147 coupled to the floor 146, extending parallel to and laterally offset from a longitudinal centerline 143 of the trailer 140, and defining a first array of engagement features 144 distributed along the left rail 147 and longitudinally offset by a pitch distance; and a right rail 147 coupled to the floor 146, extending parallel to and laterally offset from the longitudinal centerline 143 of the trailer 140 opposite the left rail 147, and defining a second array of engagement features 144 distributed along the right rail 147 and longitudinally offset by the pitch distance. In this implementation, the set of rails 147 extend along a length of the trailer 140 and define a channel below the floor 146 of the trailer 140. Alternatively, the set of rails 147 extend along a portion of the length of the trailer 140 and define a channel below the floor 146 of the trailer 140.

Additionally, the left rail 147 and the right rail 147 are configured to run along a longitudinal axis 143 of the trailer 140, parallel to the longitudinal centerline, such that, when coupled to a bogie 130, a user (e.g., an operator, a driver, a technician) or a machine may manipulate the bogie 130 between the left rail 147 and the right rail 147 to guide the bogie 130 to a target position (e.g., a longitudinal position) below the floor 146 of the trailer 140 and/or to remove the bogie 130 from the floor 146 of the trailer 140 in a service mode.

Furthermore, the set of engagement features 144 can include a bore, a slot, an aperture, or an indentation distributed along each rail 147 and configured to engage and retain a corresponding latch of a bogie 130 and/or a battery assembly 120, as further described below. However, each rail 147 can include any other type of engagement feature configured to engage and retain a set of latches 133 of a bogie 130 and/or a battery assembly 120.

4. Bogie

Generally, the bogie 130 includes: a bogie chassis 132; a set of latches 133; a driven axle 137 suspended from the bogie chassis 132; and a motor 131 coupled to the driven axle 137.

In one implementation, the bogie 130 includes: a bogie chassis 132 configured to transiently install on a left rail 147 and a right rail 147 of a trailer 140 over a range of longitudinal positions; a set of latches 133 configured to transiently engage a subset of engagement features 144, in the first array of engagement features 144 on the left rail 147 and in the second array of engagement features 144 on the right rail 147, to retain the bogie 130 below the floor 146 of the trailer 140; a driven axle 137 suspended from the bogie chassis 132; and a motor 131 coupled to the driven axle 137 configured to output torque to the driven axle 137 in a tow mode and regeneratively brake the driven axle 137 in a regenerative braking mode.

The bogie chassis 132 is configured to transiently install on a trailer 140 over a range of longitudinal positions and supports the driven axle 137. The bogie chassis 132 can be manufactured from a metal such as galvanized steel or stainless steel and coupled to the floor 146 of the trailer 140. Additionally, the bogie chassis 132 can be mounted to the floor 146 such as by welding the bogie chassis 132 to the floor 146 of the trailer 140 or bolting the bogie chassis 132 to the floor 146 of the trailer 140 via a set of fasteners.

In one variation, the bogie 132 further includes a secondary battery assembly 108 mounted to the bogie chassis 132 of the bogie 130, and the controller 150 can trigger the secondary battery assembly 108 to supply electrical energy to the motor 131 to assist motion of the bogie 130 away from the trailer 140 in a service mode.

In another variation, the bogie 130 includes a suspension system, such as a leaf suspension system, a rubber block suspension system, or an air-ride suspension system coupled to the driven axle 137. For example, the bogie 130 can include an air-ride suspension system that includes: a first air bag arranged proximal a left driven wheel 138 of the driven axle 137; and a second air bag arranged proximal a right driven wheel 139 of the driven axle 137. The bogie 130 can further include a pressure sensor 115 coupled to the driven axle 137 and configured to output a signal representing a combined air pressure in the first air bag and the second air bag. In this variation, the controller 150 is configured to leverage the air-ride suspension system and the pressure sensor 115 to monitor air pressure in the first and second air bags and calculate a weight of the trailer 140, containing a load, on the driven axle 137 based on the air pressure in the first and second air bags.

In yet another variation, the bogie 130 includes a compressed-air-brake system configured to couple to a gladhand of a brake line from a tow vehicle coupled to the trailer 140 and brake the driven axle 137 responsive to air signals received from the tow vehicle via the gladhand. For example, a user (e.g., a technician, an operator) may manually couple a supply line (e.g., an emergency brake line) and a control line (e.g., a service brake line) of the trailer 140 to a compressed air supply line of a tow vehicle via a set of hose couplings (e.g., a gladhand coupler, a gladhand connector). The user may then couple a compressed-air-brake system of the bogie 130 to the gladhand coupling between the tractor and the trailer 140. The controller 150 can then leverage the compressed air signal from the tow vehicle via the gladhand to selectively brake the driven axle 137 via the pneumatic or mechanical brake system of the trailer 140 and/or enter a regenerative braking mode and alternate the proportion of braking from the pneumatic or mechanical brake system of the trailer 140 and from regenerative braking.

Further, the system 100 can include a set of wheel speed sensors, each wheel speed sensor can couple to a corresponding driven wheel of the bogie 130. The controller 150 can then leverage signals output from each wheel speed sensor to track traction between the driven wheels of the bogie 130 and a ground surface and trigger the motor 131 to regeneratively brake the trailer, as further described below.

However, the bogie chassis 132 can be manufactured in any other way and transiently installed on the trailer 140 in any other way.

4.1 Latches

Generally, the set of latches 133 are configured to cooperate with the array of engagement features 144 distributed along the left rail 147 and the right rail 147 in order to retain the bogie 130 below the floor 146 of the trailer 140 over a range of longitudinal positions.

In one implementation, the set of latches 133 are configured to transiently engage a first subset of engagement features 144, in a first array of engagement features 144 on the left rail 147 and in a second array of engagement features 144 on the right rail 147 of the trailer 140, to retain the bogie 130 below a floor 146 of the trailer 140.

More specifically, in this implementation, each latch in the set of latches 133 can include a solenoid (e.g., an electromechanical solenoid, a pneumatic solenoid), or another electrical or mechanical latch (e.g., an air pressure latch, a mechanical lever) configured to transiently engage with a corresponding engagement feature in the array of engagement features 144 distributed along the left rail 147 and the right rail 147 of the trailer 140. Further, each solenoid or other electromechanical latch can be operable in an engaged position (e.g., a closed position) to engage and retain a corresponding engagement feature to couple the bogie 130 to the floor 146 of the trailer 140. In the engaged position, each solenoid or other latch remains engaged with the corresponding engagement feature to prevent slippage of the bogie 130 away from the trailer 140 while the trailer 140 is in motion. Alternatively, each solenoid or other latch can be operable in a disengaged position (e.g., an open position) to disengage from the corresponding engagement feature and decouple the bogie 130 from the floor 146 of the trailer 140 and thereby, enable a user to selectively adjust the position of the bogie 130 and remove or service the bogie 130 (e.g., clean the bogie 130, replace the motor 131, clean the driven wheels) without additional tools.

Additionally, each solenoid or other latch can be actuated by a user input such as a physical key, a manual switch, a manual valve or via wireless communication with a computational device (e.g., a mobile phone, a tablet) of a user (e.g., an operator, a driver, a technician) in order to engage and disengage each solenoid or other electromechanical latch from the corresponding engagement feature on the left rail 147 and the right rail 147, thereby enabling the user to freely guide the bogie 130 along the left rail 147 and the right rail 147 to a target position and/or to remove the bogie 130 for service (e.g., replacement of the left driven wheel or the right driven wheel, replacement of the motor 131). Thus, the set of latches 133 can cooperate with the engagement features 144 of the left rail 147 and the right rail 147 to prevent unauthorized access and/or removal of the bogie 130 from the trailer 140.

However, the bogie 130 can include any other type of latch or solenoid configured to support the longitudinal load of the bogie 130 in an engaged position and to transiently install the bogie 130 to the trailer 140 over a range of longitudinal positions.

4.1.1 Clamp

In one variation, the system 100 can further include a clamp (e.g., a mechanical clamp, a hydraulic clamp, an electromechanical clamp, a locking pin) configured to engage the bogie 130, on a distal end of the trailer 140, to the floor 146 of the trailer 140. The clamp is further configured to prevent slippage of the set of rails 147 along a longitudinal axis 143 of the trailer 140 and thus, the bogie 130 once the set of latches 133 are engaged with corresponding engagement features 144.

For example, a user or a machine may: arrange the bogie 130 below the floor 146 of the trailer 140 to align the set of latches 133 with corresponding engagement features 144 on the left rail 147 and the right rail 147 of the trailer 140. Then, the user may manipulate the bogie 130 along the floor 146 of the trailer 140 via the left rail 147 and the right rail 147 to guide the bogie 130 toward a target position and balance a weight distribution of the trailer 140. Once the user confirms the bogie 130 is in the target position and the set of latches 133 are in the engaged position with the left rail 147 and the right rail 147, the user may arrange the clamp in an engaged position to lock the bogie 130 to the trailer 140 and prevent slippage of the bogie 130 away from the floor 146 of the trailer 140.

Alternatively, once the user confirms the bogie 130 is in the target position and the set of latches 133 are in the engaged position with the left rail 147 and the right rail 147, a controller 150 can trigger an actuator to mechanically actuate the clamp into an engaged position to lock the bogie 130 to the trailer 140 and prevent slippage of the bogie 130 away from the floor 146 of the trailer 140.

Therefore, the clamp can cooperate with the set of latches 133 to engage and retain the bogie 130 below the floor 146 of the trailer 140, prevent slippage of the bogie 130 away from the floor 146 of the trailer 140, and prevent unauthorized access and/or removal of the bogie 130 from the trailer 140.

4.2 Drag Chain

In one variation, as shown in FIG. 1B, the system 100 can further include a drag chain coupled to the trailer chassis, arranged proximal the set of rails 147 of the trailer 140, and configured to enable a user to selectively adjust the longitudinal position of the bogie 130 without additional tools. The drag chain includes: an actuator rider guard (e.g., a chain cable carrier) configured to house a set of electrical cables (e.g., power cables); and a set of mechanical hanging brackets configured to couple to the battery assembly 120. The actuator rider guard is arranged along the longitudinal axis of the trailer 140, configured to house a set of power cables (e.g., a high-voltage power chain, a low voltage power chain, an anti-lock braking system connection cable), and includes a distal end coupled to the bogie 130.

Additionally, the battery assembly 120 is arranged proximal the bogie 130 and coupled to the bogie 130 via a set of fasteners. The battery assembly can further include a channel and the drag chain is arranged within the channel and coupled to the battery assembly 120 via the set of hanging brackets. The drag chain enables the user to selectively adjust the longitudinal position of the bogie 130 below the trailer chassis without additional tools.

For example, the actuator rider guard is configured to house a first power cable electrically coupled between the battery assembly 120 and the bogie 130 and a second power cable electrically coupled to the tow vehicle. The user may then manually disengage the set of latches of the bogie 130 from corresponding engagement features 144 along the set of rails 147 and selectively adjust the bogie 130, the battery assembly 120, and the drag chain along the set of rails 147 to a target position and thus, guide the first and second power cables within the actuator rider guard. Therefore, the drag chain enables a user to freely guide the bogie 130 over a range of longitudinal positions and prevents damage or collision to the power cables in the system 100.

4.2 Driven Axle+Motor

In one implementation, the driven axle 137 is supported by an axle housing, suspended from the bogie chassis 132, and includes a left driven wheel 138 and a right driven wheel 139. The axle housing further encapsulates a motor 131 mounted to the driven axle 137 and is configured to protect the driven axle 137 and the motor 131 when the bogie 130 is adjusted along the floor 146 of the trailer 140 and/or removed for service. In this implementation, the motor 131 is configured to drive the left driven wheel 138 and the right driven wheel 139 and thus, output torque in a tow mode. The motor 131 is further configured to regeneratively brake the left driven wheel 138 and the right driven wheel 139 to slow motion of the trailer 140 in a regenerative braking mode.

In one variation, shown in FIGURE SA, the bogie 130 includes a passive axle 134, suspended from the bogie chassis 132, adjacent the driven axle 137 and includes a left passive wheel 135 and a right passive wheel 136. In this variation, the left passive wheel 135 and the right passive wheel 136 are configured to assist motion of a trailer 140 when the left driven wheel 138 and the right driven wheel 139 are driven by the motor 131 in the tow mode.

For example, the bogie 130 can include: a bogie chassis 132; a passive axle suspended from the bogie chassis 132 and including a left passive wheel 135 and a right passive wheel 136; a driven axle 137, adjacent the passive axle, suspended from the bogie chassis 132 and including a left driven wheel 138 and a right driven wheel 139; and a motor 131 coupled to the driven axle 137. In this example, the controller 150 can trigger the motor 131 to output torque to the driven axle 137 to drive the left driven wheel 138 and the right driven wheel 139 and thus, the left passive wheel 135 and the right passive wheel 136 in the tow mode. Alternatively, the controller 150 can trigger the motor 131 to regeneratively brake the left driven wheel 138 and the right driven wheel 139 to slow motion of the trailer 140, and thus the left passive wheel 135 and the right passive wheel 136 in a regenerative braking mode.

In another variation, the bogie 130 can include a set of (e.g., two) driven axles 137 and a passive axle (e.g., a tri-axle). Each driven axle 137 is supported by an axle housing, is suspended from the bogie chassis 132, and includes a left driven wheel 138 and a right driven wheel 139. In this variation, each driven axle 137 is suspended from the bogie chassis 132 on a distal end of a trailer 140. Further, the left passive wheel 135 and the right passive wheel 136 are configured to assist motion of the trailer 140 when the left driven wheel 138 and the right driven wheel 139 of each driven axle 137 are driven by the motor 131 in the tow mode.

In yet another variation, the bogie 130 can include a set of (e.g., two) driven axles 137 and a set of (e.g., two) passive axles (e.g., a quad-axle). Each driven axle 137 is supported by an axle housing, is suspended from the bogie chassis 132, and includes a left driven wheel 138 and a right driven wheel 139. Each passive axle is suspended from the bogie chassis 132, arranged adjacent the set of driven axles 137, and includes a left passive wheel 135 and a right passive wheel 136. In this variation, each left passive wheel 135 and right passive wheel 136 are configured to balance a weight of the trailer 140 in conjunction with the left driven wheel 138 and the right driven wheel 139 of each driven axle 137.

4.2 Pressure Sensors

The system 100 can further include a set of pressure sensors 115 configured to output signals corresponding to air pressure in brake lines of the trailer 140. Each pressure sensor 115 can then transmit these signals to the controller 150.

In one variation, the system 100 can include a pressure sensor 115 configured to output signals corresponding to air pressure of an emergency brake line (e.g., a supply brake line) system of the trailer 140 from an air supply of the tow vehicle and transmit these signals to the controller 150.

In another variation, the system 100 can include a pressure sensor 115 coupled to the driven axle 137 and configured to output signals corresponding to air pressure of air bags in an air-ride suspension system coupled to the driven axle 137 and transmit these signals to the controller 150.

In yet another variation, the system 100 can include a pressure sensor 115 configured to couple to a spring-brake relay and output signals corresponding to air pressures at the spring-brake relay of the trailer 140 from an air supply of the tow vehicle and transmit these signals to the controller 150.

5. Kingpin

The system 100 further includes a kingpin 110 arranged on a proximal end of the trailer 140 opposite the bogie 130 and is configured to interface with a hitch (e.g., a fifth wheel) of a tow vehicle (e.g., a tractor trailer 140, a semitruck, a semi). The kingpin 110 further includes a set of sensors configured to output a signal representing forces applied to the kingpin 110 by the hitch, as shown in FIGS. 6A, 6B, 6C, and 6D.

In one implementation, the kingpin no includes: a head 117; a shank 116; a base in; a set of fasteners; a geolocation module; a wireless communications module; and a suite of sensors 119 including force sensors (e.g., a strain gauge, an IMU, a load cell), optical sensors (e.g., a one-dimensional depth sensor, a LIDAR sensor, an RGB camera), and/or inertial sensors (e.g., an IMU, an accelerometer, a gyroscope). The kingpin 110 is further characterized by a unitary steel alloy structure.

In one variation, the kingpin 110 is coupled to a floor 146 of a trailer 140 and is configured to transfer vertical loads from the trailer 140 into a hitch of a tow vehicle. In this variation, the set of sensors 119 are configured to: output signals representing forces applied to the kingpin no (e.g., via the force sensors); output signals representing inertial conditions of the trailer 140 (e.g., via the inertial sensors); output signals representing a location of the trailer 140 (e.g., via the geolocation module); and transmit these force data, inertial conditions data, weight distribution data, and/or geolocation data to the integrated controller via the communications module.

5.1 Base+Shank+Force Sensors

In another variation, the base in of the kingpin no defines a set of through-bores 114 arranged radially about the shank 116 and configured to receive a set of fasteners to couple the kingpin to a floor 146 of the trailer 140 and thus, fasten (e.g., mount, bolt-in) the kingpin no to the trailer 140. In this variation, the shank 116 of the kingpin no defines a first sensor receptacle extending parallel to a lateral axis of the trailer 140; and defines a second sensor receptacle extending parallel to a longitudinal axis 143 of the trailer 140. Further, a first strain gauge is arranged in the first sensor receptacle and is configured to output a signal representing shear forces in the kingpin parallel to the lateral axis and a second strain gauge is arranged in the second sensor receptacle and configured to output the second signal representing shear forces in the kingpin parallel to the longitudinal axis 143.

In another variation, the kingpin no can include a set of force sensors 119. In this variation, the kingpin no can include: a first sensor 119 configured to output signals representing lateral forces (e.g., loads) applied to the kingpin no; and a second sensor 119 configured to output signals corresponding to longitudinal forces (e.g., loads), parallel to a longitudinal axis 143 of the trailer 140, applied to the kingpin no. Each sensor can then transmit these force data to the integrated controller.

6. Controller

Figure 8:
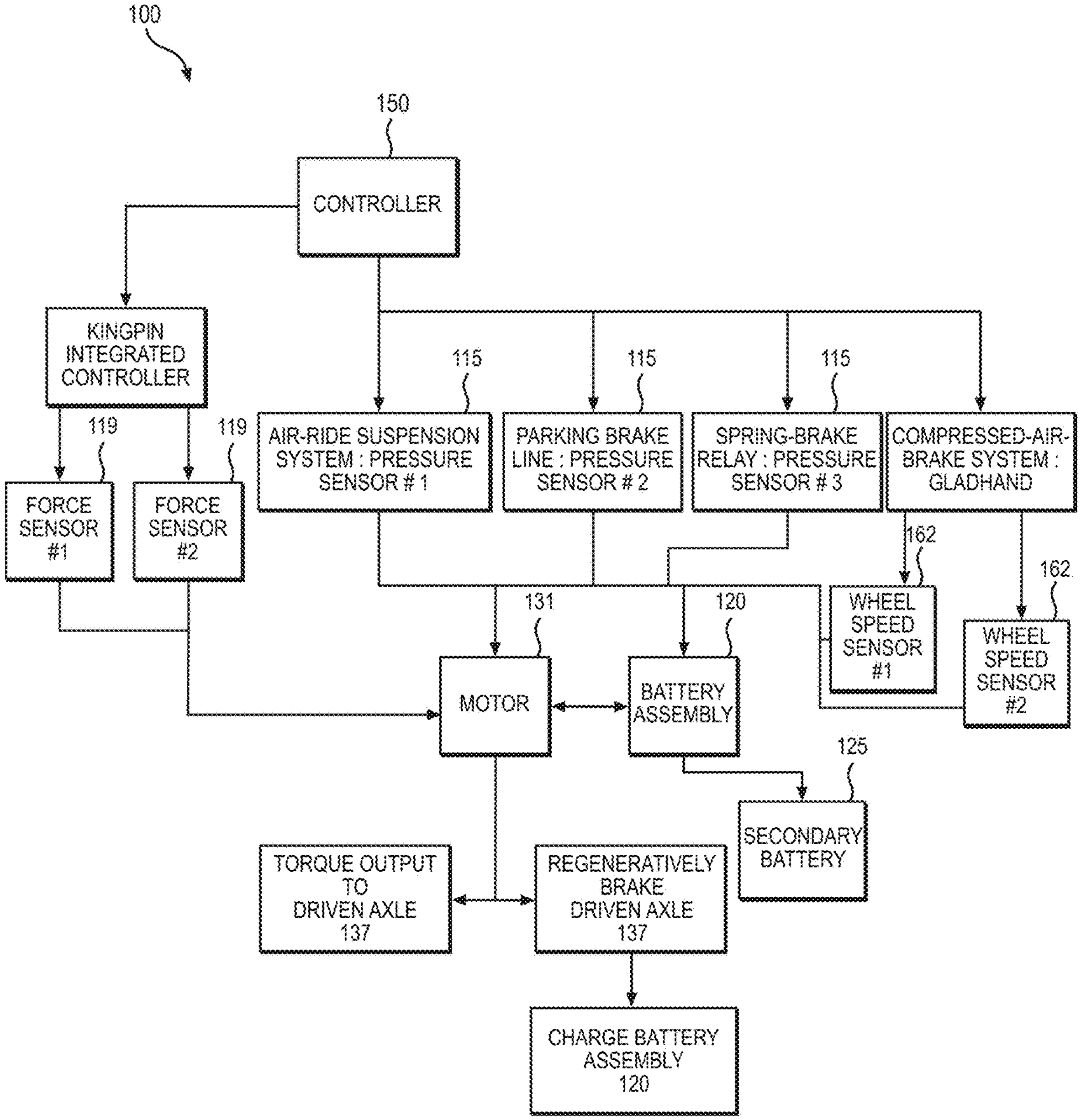
FIG. 8 is a block diagram of one variation of the system.

The controller 150 is coupled to sensors within the system 100, interfaces with the integrated controller of the kingpin no and executes methods and techniques described below to: selectively enter an operational mode (e.g., a tow mode, a regenerative braking mode, a service mode); in a tow mode, selectively operate the motor 131 of the bogie 130 to output torque to the driven axle 137; detect a direction of motion of the trailer 140; access signals output by sensors coupled to an emergency brake line (e.g., a supply brake line, a spring-brake relay), suspension systems, and wheels of the trailer 140; identify errors (e.g., sensor failure, pneumatic or mechanical brake failure of the trailer 140); and, in a regenerative braking mode, trigger the motor 131 to selectively increase or decrease the supply of an electrical energy flux to the battery assembly 120 to regeneratively brake the driven axle 137 and charge the battery assembly 120 based on these signals and identified errors, as shown in FIG. 8.

6.1 Integrated Local Controllers

In one variation, the system 100 includes a primary controller 150 and a set of local controllers. In particular, the bogie 130 can include an integrated local controller configured to interface (e.g., via wireless communication, via wired communication) with the primary controller 150: to selectively operate the motor 131 to output torque to the driven axle 137; to trigger the motor 131 to selectively increase or decrease the supply of an electrical energy flux to the battery assembly 120 to regeneratively brake the driven axle 137; and to trigger the motor 131 to selectively reduce torque output and/or increase torque output to decrease a difference between each force and the target preload force. The battery assembly 120 can include an integrated local controller configured to interface with the primary controller 150 to receive an electrical energy flux from the motor 131 to charge the battery assembly 120.

The kingpin 110 can further include an integrated local controller configured to interface with the primary controller 150 in order to: calculate a direction and a magnitude of each force applied to the kingpin no; identify a coupling and/or a decoupling event between a hitch (e.g., a fifth wheel) of a tow vehicle (e.g., a tractor-trailer) and the kingpin no based on these forces; and calculate a target preload force as a function of a condition of the trailer 140 (e.g., a speed, an incline angle, a tractor-trailer angle, a location, a charge state of a battery, a weight distribution) in a tow mode.

7. Battery Assembly

Generally, the system 100 further includes a battery assembly 120 configured to transiently install on the trailer 140 over a range of longitudinal positions and electrically couple to the bogie 130 by a power cable (or integrated directly with the bogie chassis 132 of the bogie 130) in order to supply power to the motor 131.

More specifically, the battery assembly 120 can further supply electrical energy to the motor 131 to output torque to the driven axle 137 in a tow mode and receive electrical energy from the motor 131 to charge the battery assembly 120 in a regenerative braking mode. Further, the battery assembly 120 can include a set of modular batteries configured to engage with each other and fit within a battery frame (e.g., a stressed frame). The battery frame is configured to fit below a standard floor 146 of a trailer 140 between the left rail 147 and the right rail 147 and thus, enable a user to quickly and repeatably install the battery assembly 120 or the set of modular batteries below a standard floor 146 of any trailer 140. The set of modular batteries enables a user to selectively adjust the battery capacity of the battery assembly 120 as a function of a predicted distance traveled by the trailer 140, a weight distribution of the trailer 140, a type of the trailer 140 (e.g., a dry van trailer 140, a refrigerated trailer 140), and/or a length of the trailer 140 (e.g., 20 feet, 40 feet, 48 feet, 53 feet, 60 feet).

In one implementation, the battery assembly 120 includes a set of latches 133 configured to: transiently engage a subset of engagement features 144, in the first array of engagement features 144 on the left rail 147 and in the second array of engagement features 144 on the right rail 147; and to retain the battery assembly 120 below the floor 146 of the trailer 140. In this implementation, each latch in the set of latches 133 can include a solenoid (e.g., an electromechanical solenoid, a pneumatic solenoid), or another electromechanical latch (e.g., an air pressure latch, a mechanical latch) operable in an engaged position and a disengaged position to transiently engage and/or disengage a corresponding engagement feature distributed along the left rail 147 and the right rail 147 of the trailer 140, as described above.

However, each modular battery in the battery assembly 120 can define any other shape and couple to the motor 131 in any other way.

7.1 Modular Battery Assemblies

In one variation, shown in FIGS. 4A and 4B, the battery assembly 120 can include a set of modular batteries characterized by a combined battery capacity associated with a dry van trailer type to supply electrical energy to the motor 131 in a tow mode.

For example, an operator may select a set of (e.g., two) modular battery assemblies 120 characterized by a combined battery capacity within a target capacity range associated with a dry van trailer type to power the motor 131 (e.g., between 100 kilowatt-hours and 400 kilowatt-hours). In this example, the operator or a machine may install the battery frame and a first battery assembly 120, installed in the battery frame, below the floor 146 of the trailer 140 adjacent a proximal end of the bogie 130 (e.g., facing a hitch of a tow vehicle) to engage the set of latches 133 of the first battery assembly 120 with corresponding engagement features 144 on the left rail 147 and the right rail 147 of the dry van trailer 140. Then, the user or the machine may install a second battery assembly 120, installed in the battery frame, below the floor 146 of the trailer 140 proximal a distal end of the bogie 130 opposite the first battery assembly 120 to engage a second set of latches 133 of the second battery assembly 120 with corresponding engagement features 144 on the left rail 147 and the right rail 147 of the dry van trailer 140. Once the controller 150 enters a tow mode, the controller 150 can: trigger the first battery assembly 120 to supply electrical energy via a power cable to the motor 131 of the dry van trailer type; and trigger the second battery assembly 120 to supply electrical energy to the motor 131 to output torque to the driven axle 137 in a tow mode.

In another variation, shown in FIG. 4C, the battery assembly 120 can include a set of (e.g., two) battery assemblies characterized by a combined battery capacity associated with a refrigerated trailer type to supply electrical energy to the motor 131 in a tow mode and to supply electrical energy to a refrigeration system of the trailer 140 to maintain a target temperature of perishable goods stored within the trailer 140 in a tow mode.

For example, the operator may select a set of (e.g., two) battery assemblies 120 characterized by a combined battery capacity within a target capacity range associated with a refrigerated trailer type to power the motor 131 (e.g., between 280 kilowatt-hours and 750 kilowatt-hours) and electrically couple the set of battery assemblies 120 in parallel. Similar to the example above, the user or machine may: install the first battery assembly 120 below the floor 146 of the trailer 140 adjacent a proximal end of the bogie 130 (e.g., facing a hitch of a tow vehicle); electrically couple the first battery assembly 120 to the motor 131 via a first power cable housed in the drag chain; install the second battery assembly 120 below the floor 146 of the trailer 140 proximal a distal end of the bogie 130 opposite the first battery assembly 120; and electrically couple the second battery assembly 120 to a refrigeration system of the trailer 140 via a second power cable. The controller 150 can then trigger the first battery assembly 120 to supply a first electrical energy flux to the motor 131 to output torque to the driven axle 137; trigger the second battery assembly 120 to supply a second electrical energy flux, different from the first electrical energy flux, to the refrigeration system to maintain a target temperature of the trailer 140 in the tow mode; and trigger the motor to supply electrical energy to the first battery assembly and the second battery assembly to charge the first battery assembly and the second battery assembly in the regenerative braking mode.

Alternatively, the operator may select a set of (e.g., two) battery assemblies 120 characterized by a combined battery capacity within a target capacity range associated with a refrigerated trailer type to power the motor 131 (e.g., between 280 kilowatt-hours and 750 kilowatt-hours) and electrically couple the set of battery assemblies 120 in parallel. The controller 150 can then trigger the first battery assembly and the second battery assembly to supply a first electrical load to the motor to output torque to the driven axle 137; trigger the first battery assembly and the second battery assembly to supply a second electrical load, different from the first electrical load, to the refrigeration system to maintain a target temperature of the trailer 140 in the tow mode; and trigger the motor to supply electrical energy to the first battery assembly and the second battery assembly to charge the first battery assembly and the second battery assembly in the regenerative braking mode.

Thus, the system 100 can include additional battery assemblies 120 to supply electrical energy to the refrigeration system of a refrigerated trailer 140 to maintain a temperature of goods (e.g., perishable goods) as the trailer 140 transports these goods from a start location to a termination location.

Therefore, the battery assembly 120 can include a set of modular batteries 120 that enables a user to select a battery assembly 120 characterized by a battery capacity that falls within a target capacity range associated with a particular trailer type (e.g., a dry van trailer 140, a refrigerated trailer 140) and/or to supply electrical energy to additional systems of the trailer 140.

8. Bogie Variations: Individual Motor+Dual Motors

Figure 5A:
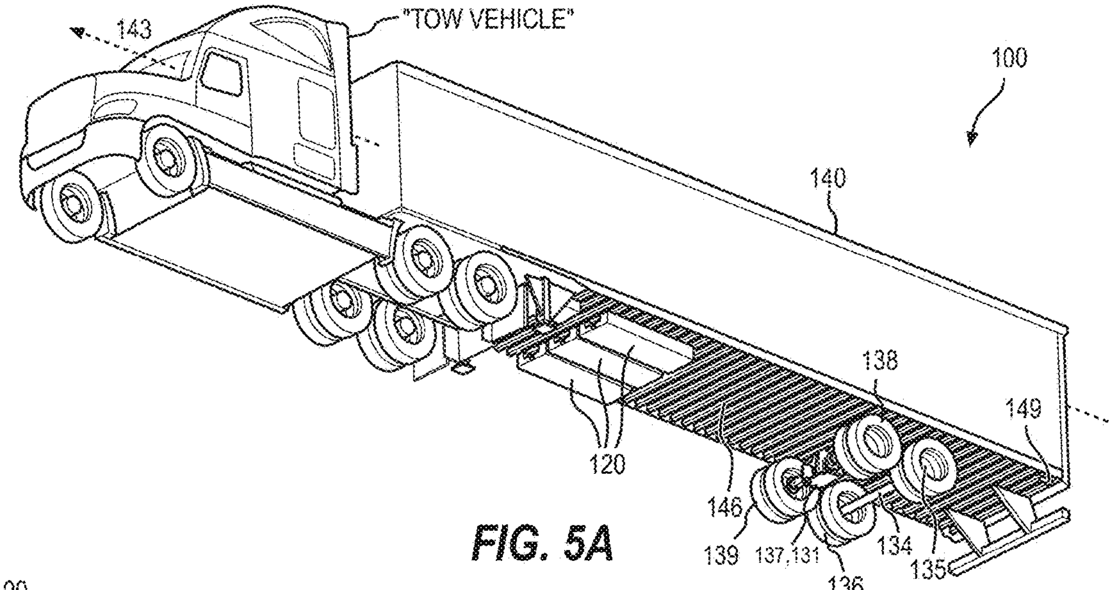
FIGS. 5A, 5B, 5C, and SD are schematic representations of one variation of the system.
Figure 5B:
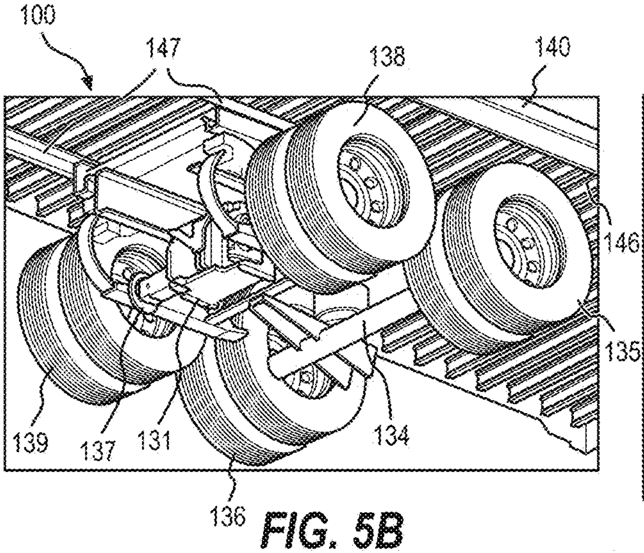
Figure 5C:
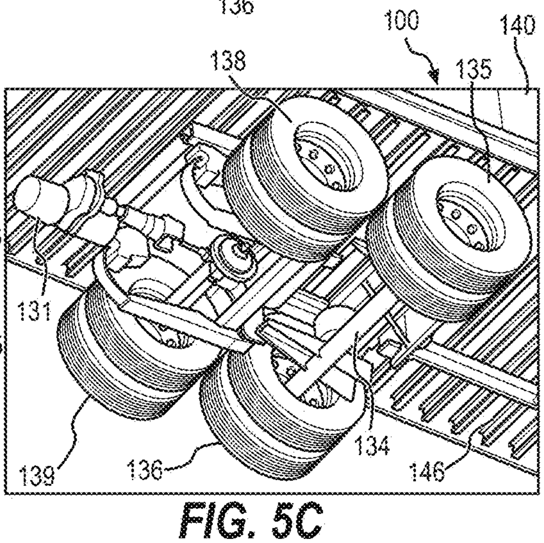

In one variation, shown in FIGS. 5A, 5B, and 5C, the motor 131 is coupled to the driven axle 137 parallel to the longitudinal centerline of the trailer 140. The controller 150 can then: detect a forward motion of the trailer 140 (e.g., via an IMU coupled to the trailer 140 of kingpin); in tow mode, trigger the battery assembly 120 to supply an electrical energy flux to the motor 131 to output torque to the left driven wheel 138 and the right driven wheel 139 in the forward direction of motion; and, in regenerative braking mode, trigger the motor 131 to supply the electrical energy flux to the battery assembly 120 to regeneratively brake the left driven wheel 138 and the right driven wheel 139 in a reverse direction of motion (e.g., opposite the forward direction of motion) to slow motion of the trailer 140.

Figure 5D:
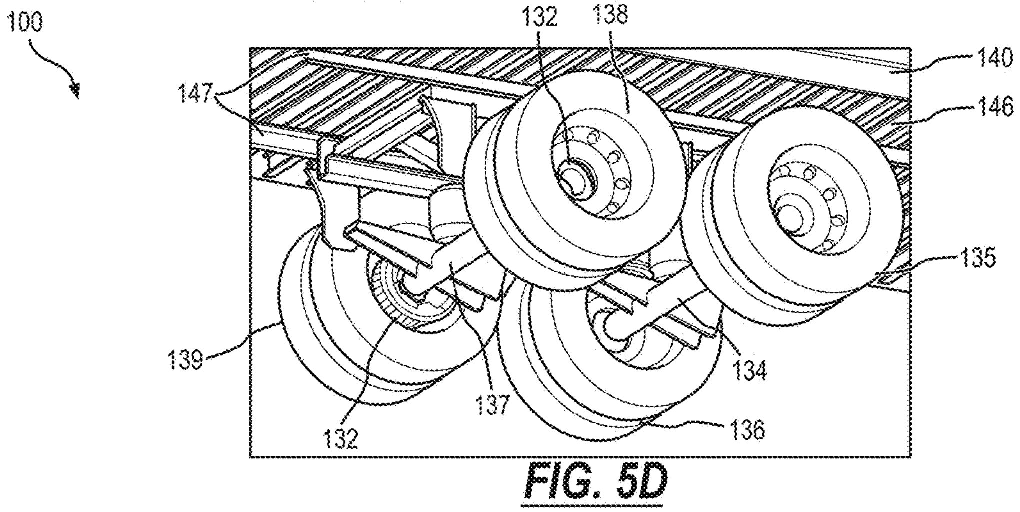
Figure 6A:
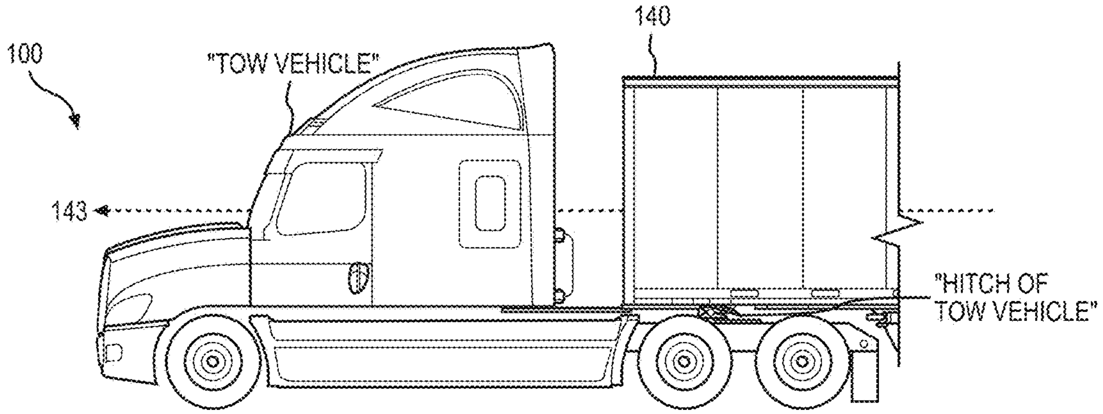
FIGS. 6A, 6B, 6C, and 6D are schematic representations of one variation of the system.
Figure 6B:
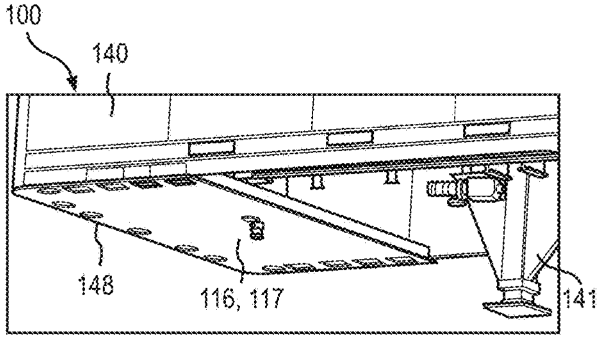
Figure 6C:
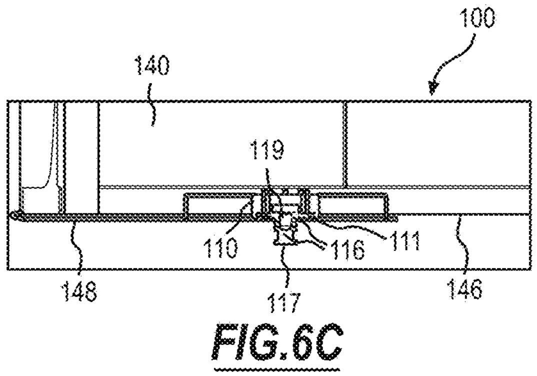
Figure 6D:
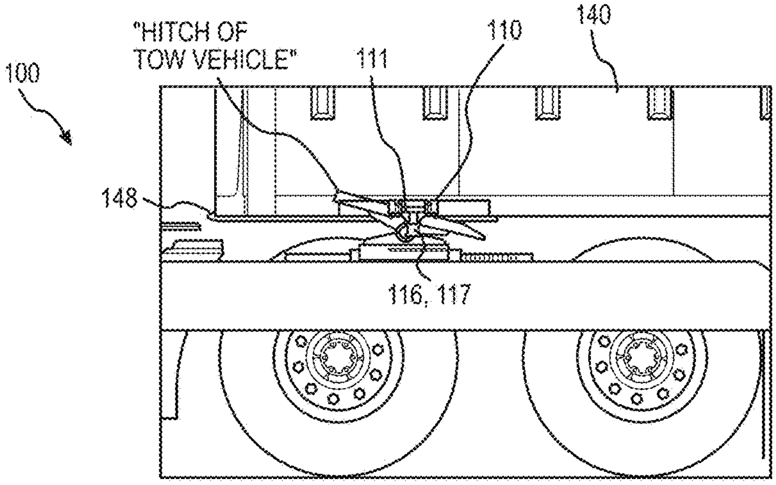
Figure 7:
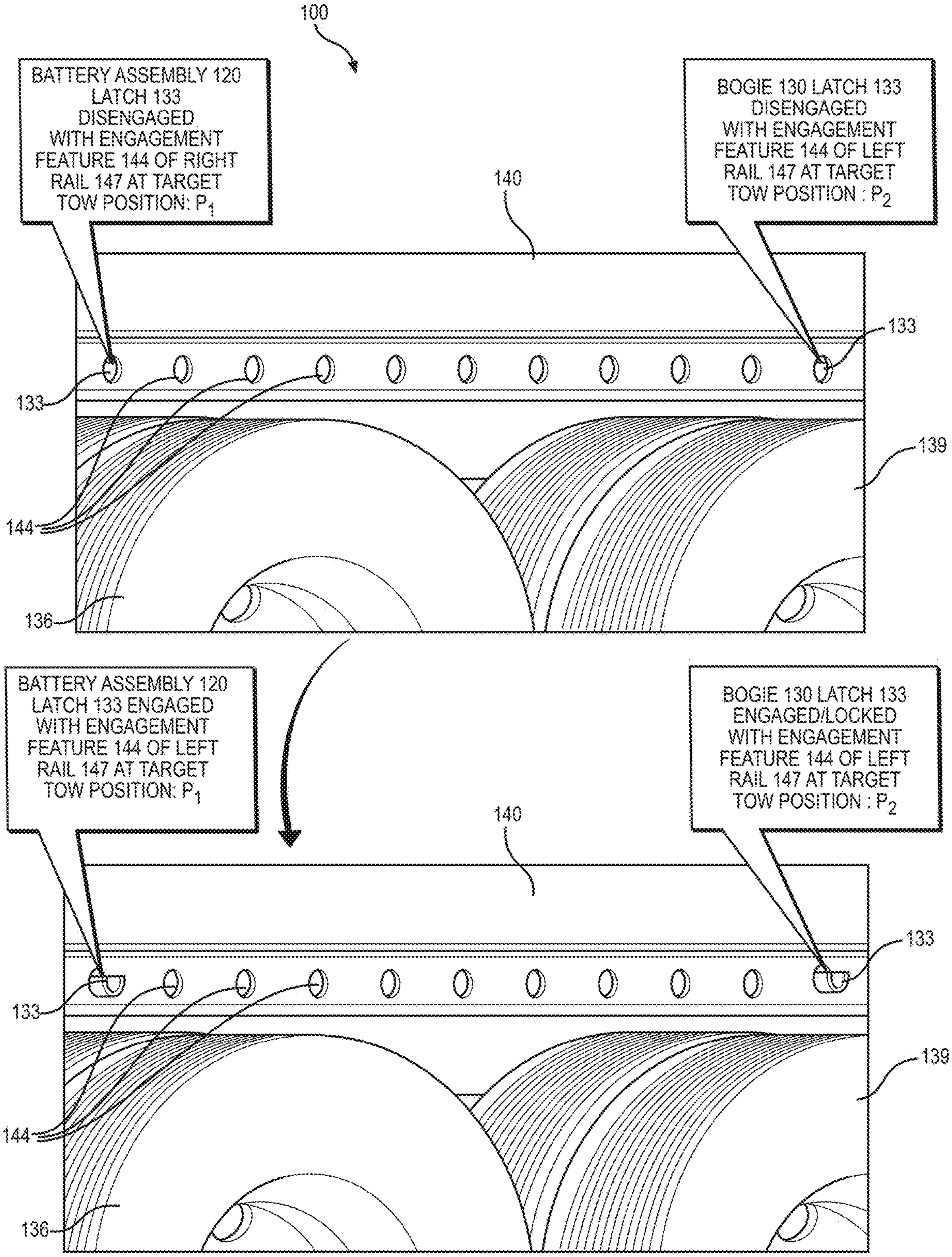
FIG. 7 is a schematic representation of one variation of the system.

In another variation, shown in FIG. 5D, the bogie 130 can include a set of motors coupled to the driven axle 137 and each motor in the set of motors is configured to output torque to a corresponding driven wheel to drive the driven wheel in the direction of motion of the trailer 140 in a tow mode and to regeneratively brake the driven wheel in a regenerative braking mode.

For example, the bogie 130 can include: a left motor coupled to a left side of the driven axle 137 and laterally offset from the longitudinal centerline of the trailer 140; and a right motor coupled to a right side of the driven axle 137 and laterally offset from the longitudinal centerline of the trailer 140 opposite the left motor. The controller 150 can then detect a forward direction of motion of the trailer 140 and in tow mode: trigger the battery assembly 120 to supply a first electrical energy flux to the left motor to output torque to the left driven wheel in the forward direction of motion; and trigger the battery assembly 120 to supply the first electrical energy flux to the right motor 131 to output torque to the right driven wheel in the forward direction of motion. In regenerative braking mode, the controller 150 can: trigger the left motor to supply a second electrical energy flux, different than the first electrical energy flux, to the battery assembly 120 to regeneratively brake the left driven wheel in a reverse direction of motion; and trigger the right motor to supply the second electrical energy flux to the battery assembly 120 to regeneratively brake the right driven wheel in the reverse direction of motion.

Therefore, the controller 150 can trigger an individual motor 131 or a set of motors coupled to the driven axle 137 to output torque to the driven axle 137 or regeneratively brake the driven axle 137, and thus, manipulate the driven wheels of the trailer 140 in a tow mode and in a regenerative braking mode.

9. Tow Mode

Generally, the user (e.g., an operator, a driver, a yard manager) or a machine (e.g., a forklift) couples the hitch (e.g., a fifth wheel) of a tow vehicle to the kingpin 110 and the controller 150 can identify a coupling event between the kingpin 110 (e.g., via a signal from a force sensor) and the hitch of the tow vehicle. In particular, the controller 150 can interface with the integrated controller to: detect an initial force impulse applied to the kingpin; interpret the initial force impulse as a coupling event with the hitch of the tow vehicle; and, in response to interpreting the initial force impulse as the coupling event with the hitch of the tow vehicle, enter a tow mode.

In one implementation, in tow mode, the controller 150 can detect conditions of the trailer 140 such as: a direction of motion of the trailer 140; a tractor-trailer (e.g., a steering angle); a speed of the trailer 140; an incline angle of the trailer 140 (e.g., a grade of a ground surface); a location of the trailer 140; forces applied to the kingpin 110 (e.g., lateral forces, longitudinal forces, vertical forces, total forces); a charge state of the battery assembly 120 coupled to the trailer 140; and/or a weight of the trailer 140 on the driven axle 137. The controller 150 can then: calculate a target preload force proportional to and/or inversely proportional to the condition of the trailer 140; and trigger the motor 131 to increase torque output and/or reduce torque output in the direction of motion of the trailer 140 to decrease a difference between the target preload force and a total force applied to the kingpin (e.g., an actual force) to control the trailer 140 in conjunction with the tow vehicle.

More specifically, during a given time period (e.g., thirty seconds, five minutes, ten minutes, one hour), the controller 150 can interface with the integrated controller of the kingpin 110 to: detect a direction of motion of the trailer 140; detect a weight distribution (e.g., a load on each axle) of the trailer 140; and set a target preload force opposite the direction of motion based on the weight distribution; detect a speed of the trailer 140; and, in response to the speed exceeding a lower speed limit (e.g., 20 miles per hour, 30 miles per hour) enable torque output and regenerative braking at the motor 131. Then, the controller 150 can: calculate a speed variance over the time window based on the speed of the trailer 140; adjust target torque output inversely proportional to the speed variance; and adjust the target preload force proportional to the speed variance. The controller 150 can further: detect a location of the trailer 140; retrieve a georeferenced location or a low-emissions region from a drive route assigned to the trailer 140; and, in response to the location falling within the threshold distance of the low-emissions region, increase target torque output and decrease the target preload force. Alternatively, in response to the location falling outside of a threshold distance of the low-emissions region, the controller 150 can decrease target torque output and increase the target preload force.

Additionally, the controller 150 can: detect an incline angle of the trailer 140; adjust target torque output proportional to the incline angle of the trailer 140; and adjust target preload force inversely proportional to the incline angle of the trailer 140. Similarly, the controller 150 can: detect a decline angle of the trailer 140; adjust target torque output inversely proportional to the decline angle of the trailer 140; and adjust the target preload force inversely proportional to the decline angle. The controller 150 can: detect a charge state of a battery assembly 120 coupled to the trailer 140; adjust target torque output proportional to the charge state of the battery assembly 120; adjust target regenerative braking inversely proportional to the charge state of the battery assembly 120; and adjust the target preload force inversely proportional to the charge state of the battery assembly 120.

Furthermore, the controller 150 can: detect a longitudinal force applied to the kingpin by a hitch of a tow vehicle (e.g., via a first strain gauge); detect a lateral force applied to the kingpin by the hitch (e.g., via a second strain gauge); calculate a tractor-trailer angle (e.g., a steering angle) based on the longitudinal force and the lateral force; adjust target torque output inversely proportional to the tractor-trailer angle; and adjust the target preload force proportional to the tractor-trailer angle. The controller 150 can then: calculate a total force applied to the kingpin no by the hitch based on the lateral force and the longitudinal force. Accordingly, in response to the total force exceeding the target preload force, the controller 150 can trigger a motor 131, arranged in the bogie 130 to increase torque output in the direction of motion of the trailer 140 to decrease a difference between the target preload force and a total force applied to the kingpin (e.g., an actual force) to control the trailer 140 in conjunction with the tow vehicle. Alternatively, in response to the total force falling below the target preload force, the controller 150 can trigger the motor 131 to reduce torque output in the direction of motion of the trailer 140 to decrease a difference between the target preload force and the total force applied to the kingpin (e.g., an actual force) to control the trailer 140 in conjunction with the tow vehicle.

Therefore, the controller 150 can leverage the dynamic target preload force, torque output, and regenerative braking: to prevent a jackknife event between the tow vehicle and the trailer 140 (e.g., tow vehicle brakes to a stop and the trailer 140 continues to move toward and push the tow vehicle or torque applied to the kingpin); to reduce emissions by the tow vehicle; to decrease fuel consumption by the tow vehicle; to extend the life of each battery assembly 120 coupled to the trailer 140; and to enable a driver of the tow vehicle to apply minimal to no brake force via the mechanical or pneumatic braking system to the trailer 140 in tow mode.

9.1 Dynamic Target Preload Force: Tractor-Trailer Angle

In one implementation, the controller 150 can detect a direction of motion and a speed of the trailer 140, detect a lateral force and a longitudinal force applied to the kingpin by the hitch, and calculate a tractor-trailer as conditions of the trailer 140. The controller 150 can leverage these conditions to selectively increase, decrease, or disable torque output and adjust the target preload force.

For example, the controller 150 can: detect a first longitudinal force applied to a kingpin, arranged on a proximal end of a trailer 140, by a hitch of a tow vehicle (e.g., via a first strain gauge); detect a first lateral force applied to the kingpin by the hitch (e.g., via a second strain gauge); detect a first speed and a first direction of motion of the trailer 140 (e.g., 30 miles per hour in forward direction via an inertial measurement unit); calculate a first tractor-trailer, between longitudinal axes of the trailer 140 and the tow vehicle, based on the first longitudinal force and the first lateral force; calculate a first total force, applied to the kingpin by the hitch, based on the first longitudinal force and the first lateral force; calculate a first target preload force opposite the first direction of motion (e.g., reverse direction) and proportional to the first tractor-trailer angle; trigger a motor 131, arranged in the bogie 130 located proximal a distal end of the trailer 140, to reduce torque output in the first direction of motion (e.g., forward direction) in order to decrease a first difference between the first total force and the first target preload force, in response to the first speed of the trailer 140 (e.g., 30 miles per hour) exceeding a first threshold speed (e.g., a lower speed limit of 20 miles per hour) and in response to the first total force falling below the first target preload force.

During a second time period, the controller 150 can: detect a second longitudinal force applied to the kingpin by the hitch; detect a second lateral force applied to the kingpin by the hitch; detect a second speed and a second direction (e.g., forward direction) of the trailer 140 (e.g., via an inertial measurement unit); calculate a second total force applied to the kingpin by the hitch based on the second longitudinal force and the second lateral force; calculate a second target preload force opposite the second direction of motion (e.g., a reverse direction) and proportional to the second tractor-trailer angle; and trigger the motor 131 to increase torque output in the second direction of motion (e.g., forward direction) to decrease a second difference between the second total force and the second target preload force, in response to the second speed exceeding the first threshold speed (e.g., 30 miles per hour) and in response to the second total force exceeding the second target preload force.

During a third time period, the controller 150 can: detect a third longitudinal force applied to the kingpin by the hitch; detect a third lateral force applied to the kingpin by the hitch; detect a third speed and a third direction of motion of the trailer 140 (e.g., a forward direction); calculate a third total force applied to the kingpin by the hitch of the tow vehicle based on the third longitudinal force and the third lateral force; and, in response to the third speed of the trailer 140 falling below a second threshold speed (e.g., 50 miles per hour), triggering the motor 131 to disable torque output in the third direction of motion. During a fourth time period, the controller 150 can: detect a fourth longitudinal force applied to the kingpin by the hitch; detect a fourth lateral force applied to the kingpin by the hitch; detect a fourth speed and a fourth direction of motion of the trailer 140 (e.g., 20 miles per hour in forward direction); in response to the fourth speed of the trailer 140 falling below the lower speed limit (e.g., 25 miles per hour), accessing a nominal low-speed preload force; calculating a fourth total force applied to the kingpin by the hitch based on the fourth longitudinal force and the fourth lateral force; and, in response to the fourth total force exceeding the nominal low-speed preload force, trigger the motor 131 to increase torque output in the fourth direction of motion (e.g., forward direction) of the tow vehicle to decrease a third difference between the fourth total force and the nominal low-speed preload force.

9.1.1 Dynamic Target Preload Force: Speed Variance+Duration

In one variation, the controller 150 can calculate a speed variance for the first time period and for the second time period and leverage the tractor-trailers, in the aforementioned example, and these speed variances to calculate the target preload force.

For example, the controller 150 can: calculate a first speed variance of the trailer 140 during the first time period based on the first speed; calculate the first target preload force proportional to the first tractor-trailer angle and proportional to the first speed variance; calculate the second tractor-trailer angle less than the first tractor-trailer angle; calculate a second speed variance of the trailer 140 during the second time period based on the second speed, the second speed variance greater than the first speed variance; and calculate the second target preload force, approximating the first target preload force, proportional to the second tractor-trailer angle and proportional to the second speed variance.

In another variation, the controller 150 can calculate a duration of the trailer 140 exhibiting the first speed during the first time period and exhibiting the first speed during a next time period. The controller 150 can then calculate the target preload force inversely proportional to these durations for the corresponding time period.

For example, the controller 150 can detect a first speed and a first direction of motion of the trailer 140 (e.g., 30 miles per hour in forward direction via an inertial measurement unit) and detect a first total force applied to the kingpin by the hitch during a first time period. The controller 150 can then: detect a first duration of the trailer 140 exhibiting the first speed; and calculate a first target preload force opposite the direction of motion of the tow vehicle and inversely proportional the first duration. During a second time period, the controller 150 can: detect a second speed of the trailer 140 corresponding to the first speed of the trailer 140; detect a second duration of the trailer 140 exhibiting the second speed; and, in response to the second duration exceeding the first duration, calculate a second target preload force, less than the first target preload force, opposite the direction of motion and inversely proportional the second duration. The controller 150 can then trigger the motor 131 to reduce torque output in the first direction of motion (e.g., forward direction) to decrease a first difference between the first total force and the first target preload force in response to the first total force falling below the first target preload force.

Therefore, the controller 150 can leverage the target preload force at the kingpin 110 to control the trailer 140 as the speed of the trailer 140 and a duration of the speed fluctuates during a drive route and thereby, enable a user (e.g., a driver) of the tow vehicle to apply minimal to no assistance to the trailer 140.

9.1.2 Dynamic Target Preload Force: Stiction+Regenerative Braking

In one variation, the controller 150 can detect a difference between the first total force and a second total force (e.g., a force impulse) for a duration of time while the trailer 140 is in motion. The controller 150 can then leverage the speed of the trailer 140, a threshold difference, and a threshold duration of time to identify a stiction event between the kingpin 110 and the hitch of the tow vehicle.

For example, the controller 150 can, during a first time period: detect a first total force applied to the kingpin no by the hitch of the tow vehicle; detect a speed and a direction of motion of the trailer 140 (e.g., 30 miles per hour in forward direction via an inertial measurement unit); based on the total force, calculate a tractor-trailer angle, between longitudinal axes of the trailer 140; calculate a target preload force opposite the first direction of motion (e.g., reverse direction) and proportional to the first tractor-trailer angle; trigger the motor 131 to reduce torque output in the direction of motion (e.g., forward direction) in order to decrease a difference between the total force and the target preload force, in response to the speed of the trailer 140 (e.g., 30 miles per hour) exceeding a threshold speed (e.g., a lower speed limit of 25 miles per hour) and in response to the total force falling below the target preload force.

During a second period of time, the controller 150 can: detect a second total force applied to the kingpin no by the hitch of the tow vehicle; detect a speed and a direction of motion of the trailer 140 (e.g., 30 miles per hour in forward direction via an inertial measurement unit); detect a difference between the first total force and the second total force for a duration of time (e.g., 5 minutes); and, in response to the difference exceeding a threshold difference and in response to the duration exceeding a threshold duration of time, identify a stiction event between the kingpin no and the hitch of the tow vehicle and trigger the motor 131 to regeneratively brake the trailer 140. The controller 150 can then detect a third total force applied to the kingpin 110; and trigger the motor 131 to increase torque output in the direction of motion (e.g., forward direction) to decrease a difference between the third total force and the target preload force in response to the third total force exceeding the target preload force.

Therefore, the controller 150 can monitor forces applied to the kingpin 110 to identify a stiction event between the kingpin no and the hitch of the tow vehicle and trigger the motor 131 to selectively apply a regenerative braking force to slow motion of the trailer 140.

9.2 Dynamic Target Preload Force: Incline Angle of Trailer

In one implementation, the controller 150 can detect an incline angle of the trailer 140 representing a grade of the road (e.g., 5% grade, 10% grade) as a condition of the trailer 140 and then leverage the incline angle to selectively adjust the target preload force. Additionally, in response to the incline angle exceeding a threshold incline angle (e.g., trailer 140 is moving up a hill), the controller 150 can decrease the target preload force. Alternatively, in response to the incline angle falling below the threshold incline angle (e.g., trailer 140 is moving down a hill), the controller 150 can increase the target preload force.

For example, during a first time period, the controller 150 can: detect a first longitudinal force applied to the kingpin no by the hitch; detect a first lateral force applied to the kingpin by the hitch of the tow vehicle; detect a first direction of motion of the trailer 140 (e.g., a forward direction); detect a first incline angle of the trailer 140 (e.g., 2.86 degrees); calculate a first total force, applied to the kingpin by the hitch of the tow vehicle, based on the first longitudinal force and the first lateral force; calculate a first target preload force opposite the first direction of motion (e.g., a reverse direction) and proportional to the first incline angle; and, in response to the first total force falling below the first target preload force, trigger the motor 131 to reduce torque output in the first direction of motion (e.g., forward direction) in order to decrease a first difference between the first total force and the first target preload force.

During a second time period, the controller 150 can: detect a second force applied to the kingpin by the hitch of the tow vehicle; detect a decline angle of the trailer 140 (e.g., −0.573 degrees); calculate a second target preload force opposite the direction of motion of the tow vehicle and inversely proportional to the decline angle; and, in response to the second force falling below the second target preload force, trigger the motor 131 to increase torque output opposite the direction of motion (e.g., reverse direction) in order to decrease the second difference between the second force and the second target preload force.

Alternatively, the controller 150 can: calculate a second total force applied to the kingpin by the hitch of the tow vehicle based on the second longitudinal force and the second lateral force; calculate a second target preload force opposite the second direction of motion and proportional the decline angle of the trailer 140; and, in response to the second total force exceeding the second target preload force, trigger the motor 131 to regeneratively brake a driven axle 137 to slow motion of the trailer 140 and to decrease a second difference between the second total force and the second target preload force.

Therefore, the controller 150 can leverage the target preload force at the kingpin 110 to control the trailer 140 as the incline angle of the trailer 140 fluctuates as the trailer 140 navigates road grades during a drive route and thereby, reduce emissions and fuel consumption by the tow vehicle.

9.3 Dynamic Target Preload Force: Drive Route+Location of Trailer

In one variation, the controller 150 can detect a location of the trailer 140 as a condition of the trailer 140 and then leverage the location and a drive route assigned to the trailer 140 to selectively increase or decrease the target preload force.

Furthermore, an operator may define a start location and an end location for a drive route and upload this drive route to a user portal. The controller 150 can then: access the drive route; estimate a set of legs between the start location and the end location for the drive route; and populate each leg of the drive route with a time window, a corresponding georeferenced location, and emission conditions associated with the georeferenced location (e.g., a low-emissions region). The computer system can then access this drive route at the start of the tow mode. The controller 150 can also access signals from a gyroscope or an inertial sensor to detect locations of the trailer 140 during the drive route.

For example, during a first time period, the controller 150 can: detect a first longitudinal force applied to the kingpin no by the hitch of the tow vehicle; detect a first lateral force applied to the kingpin by the hitch; detect a first direction of motion and first speed of the trailer 140 (e.g., a forward direction); detect a first tractor-trailer; calculate a first total force, applied to the kingpin by the hitch, based on the first longitudinal force and the first lateral force; calculate a first target preload force opposite the first direction of motion (e.g., a reverse direction) and proportional the tractor-trailer; and, in response to the first total force falling below the first target preload force, trigger the motor 131 to reduce torque output in the first direction of motion (e.g., forward direction) in order to decrease a first difference between the first total force and the first target preload force.

During a second time period, the controller 150 can: detect a second longitudinal force applied to the kingpin no by the hitch of the tow vehicle; detect a second lateral force applied to the kingpin by the hitch; detect a second direction of motion and a second speed of the trailer 140 (e.g., a forward direction); detect a second tractor-trailer; retrieve a first low-emissions region from a drive route assigned to the trailer 140; detect a first location of the trailer 140 (e.g., via an inertial measurement unit); calculate a second total force, applied to the kingpin by the hitch, based on the second longitudinal force and the second lateral force; calculate a second target preload force opposite the second direction of motion (e.g., a reverse direction) and proportional to the second tractor-trailer; and, in response to the first location falling within the threshold distance of the low-emissions region and in response to the second speed exceeding the first threshold speed (e.g., 25 miles per hour) and in response to the second total force exceeding the target preload force, trigger the motor 131 to reduce torque output in the second direction of motion (e.g., forward direction) in order to decrease a second difference between the first total force and the first target preload force.

During a third time period, the controller 150 can: detect a third speed and a third direction of motion of the trailer 140 (e.g., forward direction); retrieve a last georeferenced location (e.g., a storage yard) from the drive route assigned to the trailer 140; detect a second location of the trailer 140; and, in response to the third speed of the trailer 140 falling below the first threshold speed and in response to the second location of the trailer 140 falling within the threshold distance of the last georeferenced location (e.g., a storage yard), trigger the motor 131 to disable torque output in the third direction of motion (e.g., forward direction).

Therefore, the controller 150 can selectively increase or decrease the target preload force and the target torque output by the motor 131 as the location of the trailer 140 fluctuates during the drive route. Additionally, the controller 150 can also leverage the target preload force and the location of the trailer 140 to enable a user (e.g., a driver) of the tow vehicle to apply minimal to no brakes to the trailer 140.

9.4 Dynamic Target Preload Force: Charge State of Battery

In one variation, the controller 150 can detect a “real-time” battery status (or a “charge state”) of each battery in the battery assembly 120 coupled to the trailer 140. The controller 150 can then detect a charge state of the battery assembly 120 (e.g., a numerical value, a percentage, a level) as a condition of the trailer 140 and leverage this charge state of the battery assembly 120 to selectively adjust the target preload force.

For example, during a first time period, the controller 150 can: detect a first longitudinal force applied to the kingpin no by the hitch of the tow vehicle; detect a first lateral force applied to the kingpin by the hitch; detect a first direction of motion and a first speed of the trailer 140 (e.g., a forward direction); detect a first charge state of the battery assembly 120 (e.g., 55%); detect a first tractor-trailer angle; calculate a first total force, applied to the kingpin by the hitch, based on the first longitudinal force and the first lateral force; calculate a first target preload force opposite the first direction of motion (e.g., a reverse direction) proportional to the tractor-trailer angle and inversely proportional to the first charge state of the battery assembly 120; and, in response to the first total force falling below the first target preload force, trigger the motor 131 to reduce torque output in the first direction of motion (e.g., forward direction) to decrease a first difference between the first total force and the first target preload force.

During a second time period, the controller 150 can: detect a second longitudinal force applied to the kingpin 110 by the hitch of the tow vehicle; detect a second lateral force applied to the kingpin by the hitch; detect a second direction of motion and a second speed of the trailer 140 (e.g., a forward direction); detect a second tractor-trailer angle less than the first tractor-trailer angle; detect a second charge state of the battery assembly 120 (e.g., 75%) greater than the first charge state of the battery assembly 120 (e.g., 55%); calculate a second total force, applied to the kingpin by the hitch, based on the second longitudinal force and the second lateral force; calculate a second target preload force opposite the second direction of motion (e.g., a reverse direction) proportional to the second tractor-trailer angle and inversely proportional to the second charge state of the battery assembly 120 (e.g., 75%); and, in response to the second total force exceeding the target preload force, trigger the motor 131 to reduce torque output in the second direction of motion (e.g., forward direction) to decrease a second difference between the first total force and the first target preload force.

Additionally or alternatively, the controller 150 can access the drive route assigned to the trailer 140 and predict a charge state of the battery assembly 120 at the start of the tow mode. Then for each leg of the drive route, the controller 150 can autonomously increase or decrease the target preload force at the kingpin 110 proportional the predicted charge state of the battery assembly 120 associated with each leg of the drive route.

Therefore, the controller 150 can leverage a "real-time" charge state or a predicted charge state of the battery assembly 120 to selectively increase or decrease the target preload force and thereby, increase the life of the battery assembly 120 and reduce emissions by the tow vehicle.

10. Regenerative Braking Mode

Figure 2:
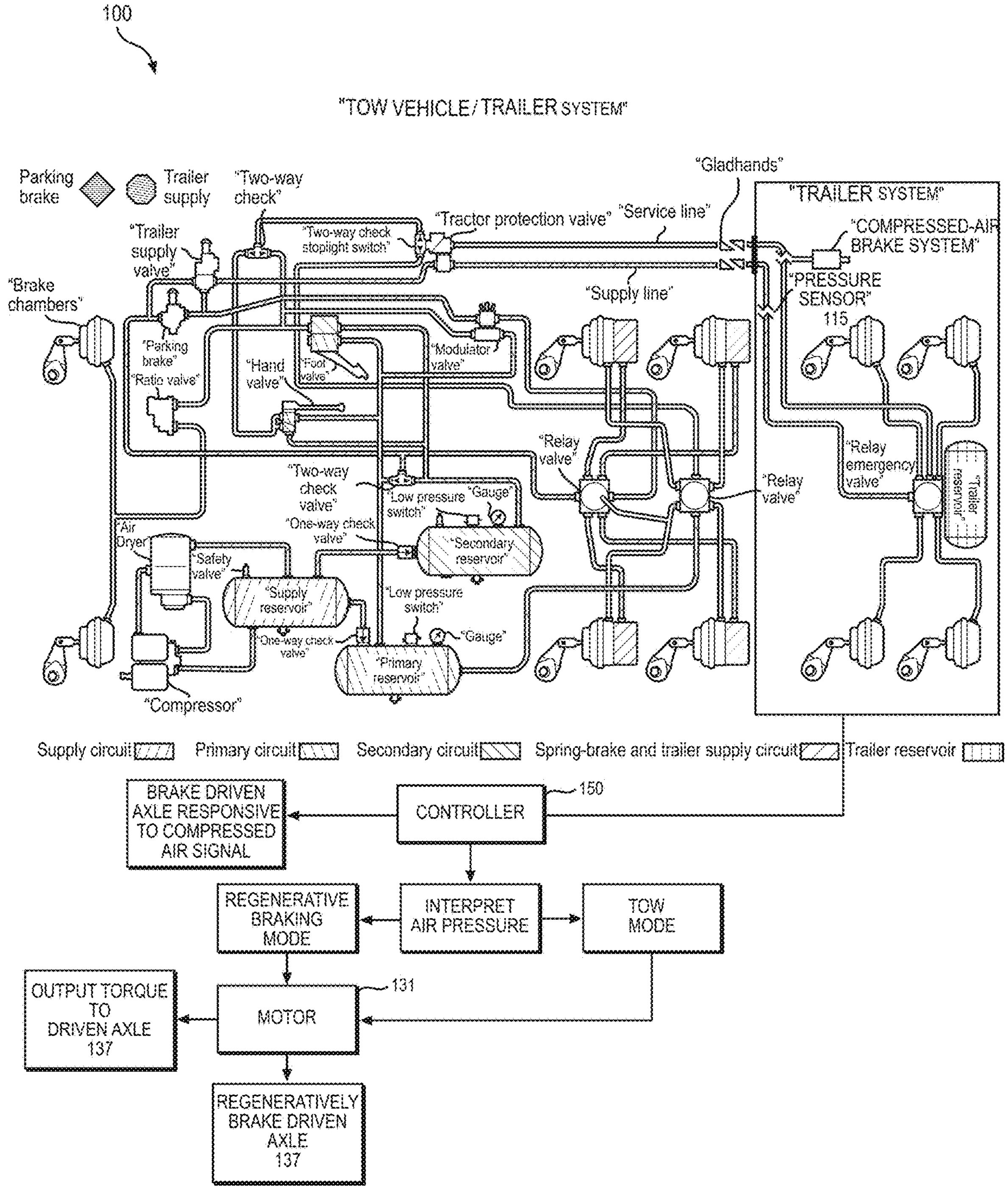
FIG. 2 is a block diagram of one variation of the system.

In one variation, as shown in FIG. 2, the controller 150 can leverage signals output by a pressure sensor 115 coupled to a spring-brake relay of a tow vehicle to automatically transition from the tow mode to the regenerative braking mode and vice versa. Further, in response to the air pressure exceeding a threshold air pressure, the controller 150 can maintain the tow mode and trigger the battery assembly 120 to supply electrical energy to the motor 131 to output torque to the driven axle 137. Alternatively, in response to the air pressure falling below the threshold air pressure, the controller 150 can: identify the air pressure from the tow vehicle as braking from the pneumatic or mechanical system; and trigger the motor 131 to supply electrical energy to the battery assembly 120 to regeneratively brake the driven axle 137 and charge the battery assembly 120.

For example, the system 100 can include a pressure sensor 115 coupled to a spring-brake relay of a tow vehicle and configured to output signals corresponding to air pressures at the spring brake-relay from an air supply of the tow vehicle. At a first time, the controller 150 can then: access a first signal from the pressure sensor 115; interpret a first air pressure at the spring-brake relay based on the first signal; identify absence of braking from the pneumatic or mechanical system and, in the tow mode, trigger the battery assembly 120 to supply electrical energy to the motor 131 to output torque to the driven axle 137. At a second time, the controller 150 can: access a second signal from the pressure sensor 115; interpret a second air pressure at the spring-brake relay based on the second signal; detect a difference between the first air pressure and the second air pressure; and, in response to detecting the difference falling below a threshold pressure difference, enter a regenerative braking mode.

Additionally, in the regenerative braking mode, the system 100 can leverage signals from a pressure sensor 115 coupled to the emergency brake line (e.g., a supply brake line) of the trailer 140 to enter a maximum regenerative braking mode. In particular, in response to an air pressure in the emergency brake line exceeding a threshold air pressure, the controller 150 can: identify absence of braking from the pneumatic or mechanical system for the emergency brake line; and enter a maximum regenerative braking mode.

For example, the system 100 can further include a pressure sensor 115 configured to output signals corresponding to air pressure of a emergency brake line at the trailer 140 from a tow vehicle. Then, the controller 150 can: access a first signal from the pressure sensor 115; interpret a first air pressure of the emergency brake line of the trailer 140 based on the first signal; and, in response to the first air pressure exceeding a threshold air pressure, identify absence of braking from the pneumatic or mechanical system for the emergency brake line and enter a maximum regenerative braking mode. Then, in the maximum regenerative braking mode, the controller 150 can trigger the motor 131 to supply a maximum electrical energy flux to the first battery assembly 120 to regeneratively brake the driven axle 137 and charge the battery assembly 120.

Therefore, the controller 150 can leverage signals output by pressure sensors 115 to automatically transition between the tow mode and the regenerative braking mode.

10.1 Variation: Mechanical Braking vs. Regenerative Braking

In one variation, the controller 150 can detect a charge state of the battery assembly 120 (e.g., a numerical value, a percentage, a level, a capacity) as a condition of the trailer 140 and leverage this charge state of the battery assembly 120 to selectively adjust the ratio of mechanical braking and regenerative braking force output by the motor 131 in regenerative braking mode. Further, the controller 150 can leverage a proportion of the capacity of the battery assembly 120 to power an emergency braking system (e.g., an anti-lock braking system) of the trailer 140 in the regenerative braking mode and thus, prevent a lockup event at the wheels of the trailer 140.

For example, the controller 150 can: access a capacity of the battery (e.g., 100%); calculate a minimum capacity of the battery to power the emergency brake system of the trailer 140 in the regenerative braking mode (e.g., 10%); define a threshold charge state (e.g., 50%) for the battery in regenerative braking mode based on a remaining proportion of the capacity (e.g., 90%); and leverage the threshold charge state to increase or decrease regenerative braking by the motor 131 to the driven axle 137 in regenerative braking mode. Thus, the controller 150 can implement methods and techniques described below to detect absence of a braking force from a pneumatic or mechanical brake system of the tow vehicle, identify a brake failure at the pneumatic or mechanical brake system, and leverage the minimum capacity of the battery to power the emergency brake system of the trailer 140 to slow motion of the trailer 140.

In one implementation, the controller 150 can detect a direction of motion of the trailer 140, implement methods and techniques described above to track the charge state of the battery, and selectively increase or decrease the regenerative braking force output by the motor 131 as a function of the charge state of the battery. For example, the controller 150 can: detect a forward direction of motion of the trailer 140; detect a charge state of the battery; and, in response to the charge state falling below a threshold charge state, trigger the motor 131 to increase a regenerative braking force, opposite the direction of motion, to the driven axle 137. Alternatively, the controller 150 can: detect a charge state of the battery; and, in response to the charge state of the battery exceeding the threshold charge state, trigger the motor 131 to reduce the regenerative braking force, opposite the direction of motion, to the driven axle 137.

10.2 Variation: Compressed-Air-Brake System+Traction

In one variation, as shown in FIG. 2, the bogie 130 can further include a compressed-air-brake system configured to couple to a gladhand of a brake line from a tow vehicle coupled to the trailer 140 and brake the driven axle 137 responsive to air signals received from the tow vehicle via the gladhand. Further, the system 100 can include a set of wheel speed sensors. Each wheel speed sensor can couple to a corresponding driven wheel of the bogie 130 and the controller 150 can leverage signals output from each wheel speed sensor to track traction between the driven wheels of the bogie 130 and a ground surface and trigger the motor 131 to regeneratively brake the trailer. Alternatively, the controller 150 can access signals output from sensors coupled to an anti-lock braking system of the tow vehicle to automatically trigger the motor 131 to apply a braking force to the driven axle 137 via the pneumatic or mechanical brake system of the trailer 140 and/or via regenerative braking.

For example, a user (e.g., a technician, an operator) may manually couple an emergency brake line (e.g., a supply brake line) and a service brake line (e.g., a control brake line) of the trailer 140 to a compressed air supply line of a tractor via a set of hose couplings (e.g., a gladhand coupler, a gladhand connector). The user may then couple a compressed-air-brake system of the bogie 130 to the gladhand coupling between the tractor and the trailer 140. Then, in response to detecting an air signal from the tractor via the gladhand at the compressed-air-brake system, the controller 150 can selectively brake the driven axle 137 via the pneumatic or mechanical brake system of the trailer 140. The controller 150 can further implement methods and techniques described below to enter a regenerative braking mode and alternate the proportion of braking between the pneumatic or mechanical brake system of the trailer 140 and regenerative braking.

In one implementation, the controller 150 can further leverage signals output from each wheel speed sensor to track a level of traction of the left driven wheel 138 and the right driven wheel 139 with a ground surface below the trailer 140 and selectively increase or decrease regenerative braking of the left driven wheel 138 and the right driven wheel 139 based on the level of traction.

For example, the controller 150 can: access an air signal from the tow vehicle via the gladhand; interpret an air pressure from the tow vehicle; and, in response to the air pressure exceeding a threshold air pressure, identify a braking force applied to the driven axle 137 from the pneumatic or mechanical brake system of the trailer 140 and trigger the motor 131 to disable torque output to the driven axle 137 in tow mode. Then, the controller 150 can interface with the integrated controller of the kingpin no to: detect a force applied to the kingpin by the hitch based on the second signal output by the set of force sensors; and access a target preload force on the kingpin 110. Then, in response to the force exceeding the target preload force, the controller 150 can trigger the motor 131 to supply a first electrical energy flux to the battery assembly 120 in the regenerative braking mode. The controller 150 can then: detect loss of traction at the driven axle 137 (e.g., between the left driven wheel 138 and a ground surface) based on a signal output by the set of wheel speed sensors; and, in response to detecting loss of traction at the driven axle 137 and in response to the force exceeding the target preload force, trigger the motor 131 to supply a second electrical energy flux, less than the first electrical energy flux, to the first battery assembly 120 in the regenerative braking mode to reduce the proportion of regenerative braking output to the driven axle 137.

In the regenerative braking mode, the controller 150 can then: detect a presence of traction at the driven axle 137 (e.g., between the left driven wheel 138 and the ground surface) based on a next signal output by the set of wheel speed sensors; and, in response to detecting presence of traction at the driven axle 137, automatically trigger the motor 131 to supply the first electrical energy flux to the battery assembly 120 to increase regenerative braking to the driven axle 137 (e.g., the left driven wheel 138).

Therefore, the controller 150 can leverage air signals received from the tow vehicle via the gladhand, the target preload force, and signals output from the set of wheel speed sensors to automatically apply a proportion of braking force to the driven axle 137 from the pneumatic or mechanical brake system of the trailer 140 and/or regeneratively brake the driven axle 137, and thereby, maintain traction between the driven wheels of the trailer 140 and a ground surface.

10.2 Variation: Air-ride Suspension System+Weight on Driven Axle

Figure 3A:
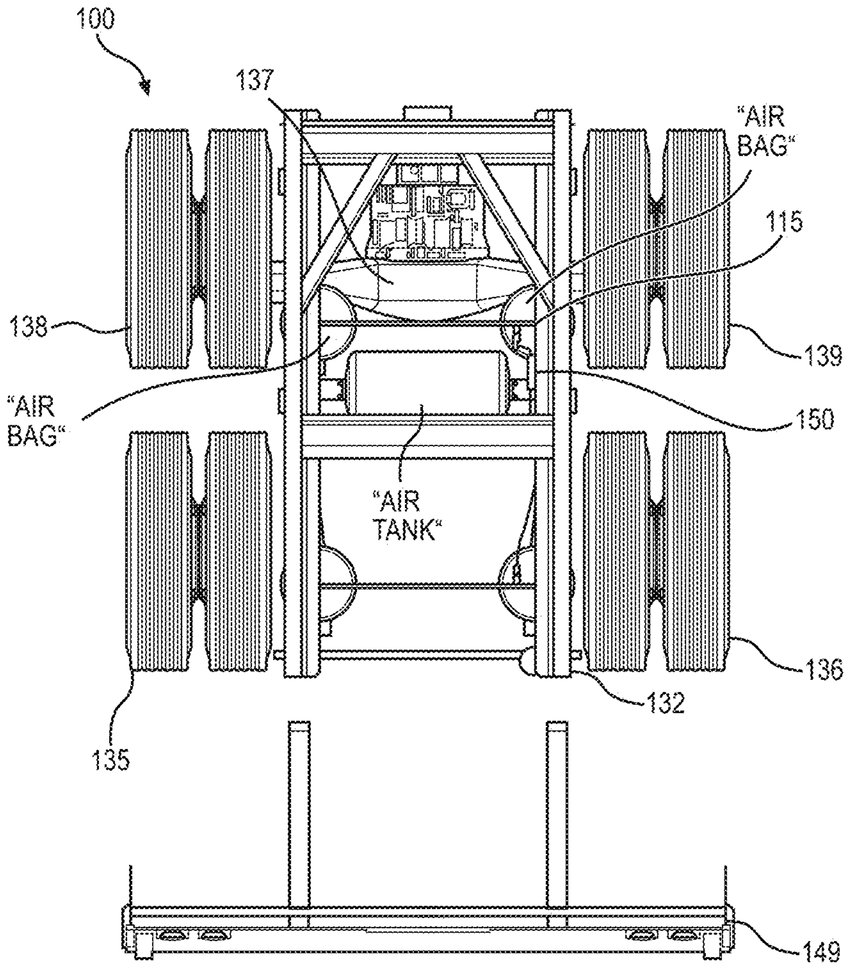
FIGS. 3A, 3B, 3C, and 3D are schematic representations of one variation of the system.
Figure 3B:
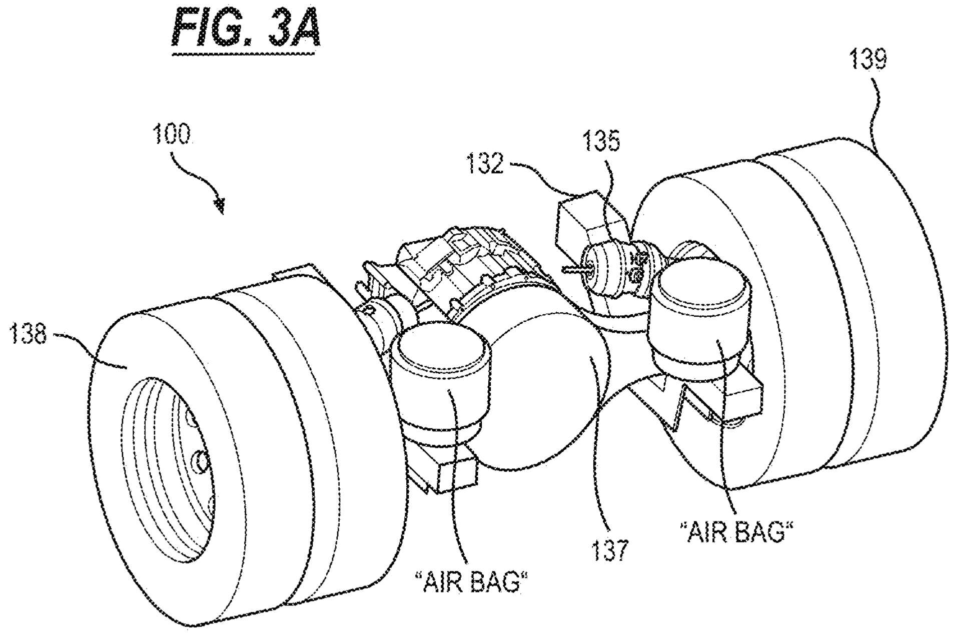
Figure 3C:
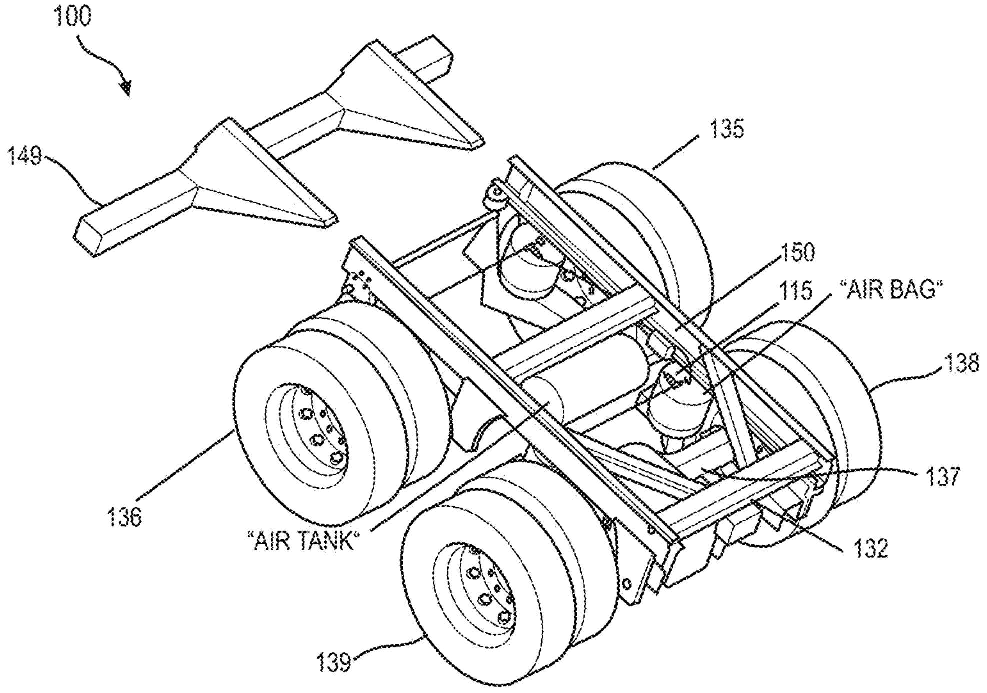
Figure 3D:
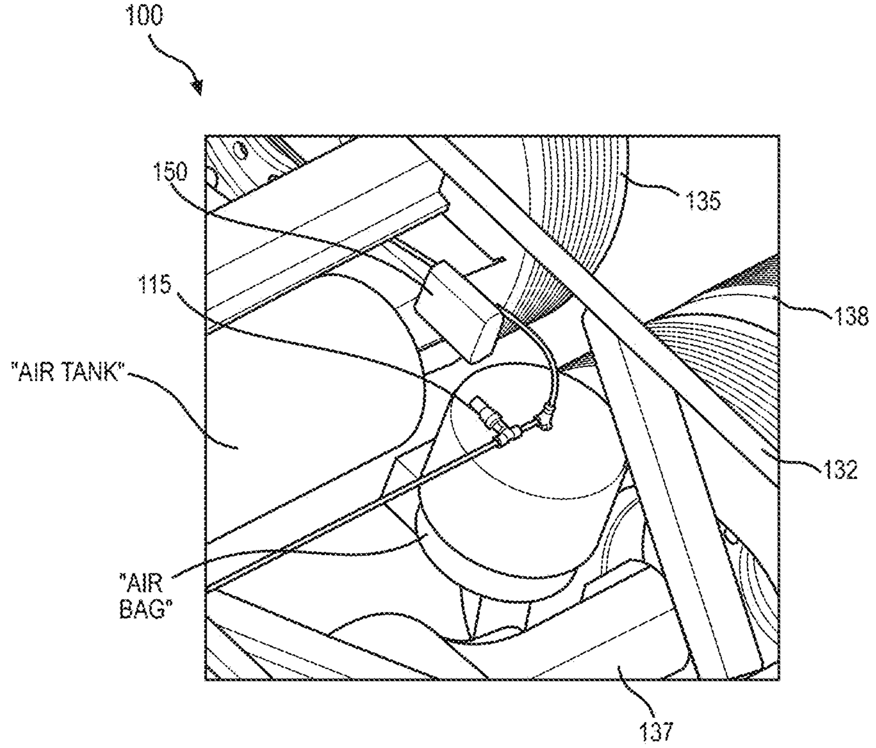

In one variation, as shown in FIGS. 3A and 3B, the bogie 130 can further include an air-ride suspension system coupled to the driven axle 137 and a pressure sensor 115 configured to output signals representing combined air pressures of air bags in the air-ride suspension system. The controller 150 can then leverage these combined air pressures to approximate a weight of the trailer 149 (e.g., a load, a payload) on the driven axle 137 and then selectively trigger the motor 131 to apply positive torque to the driven axle 137 and/or to regeneratively brake the driven axle 137 to (e.g., apply negative torque to the driven axle 137) of the trailer 140 to slow motion of the trailer 140.

For example, the bogie 130 can include an air-ride suspension system coupled to the driven axle 137. The air-ride suspension system includes: a first air bag arranged proximal the left driven wheel 138; and a second air bag arranged proximal the right driven wheel 139. The bogie 130 can further include a pressure sensor 115 coupled to the driven axle 137 and configured to output a signal representing a combined air pressure in the first air bag and the second air bag. The controller 150 can then interface with the integrated controller of the kingpin no to: detect a force applied to the kingpin by a hitch of a tow vehicle; detect a direction of motion of the trailer 140 (e.g., forward direction); and access a target preload force. The controller 150 can detect a first combined air pressure in the first air bag and the second air bag based on the signal output by the pressure sensor 115. Then, in response to the first combined air pressure in the first air bag and the second air bag exceeding a threshold air pressure and in response to the first force falling below the target preload force, the controller 150 can: trigger the motor 131 to disable torque output to the driven axle 137; enter a regenerative braking mode; and trigger the motor 131 to supply an electrical energy flux to the battery assembly 120 to regeneratively brake the driven axle 137 in the regenerative braking mode.

In another variation, the controller 150 can: detect an air pressure of an air-ride suspension system coupled to the driven axle 137 (e.g., via a pressure sensor 115); approximate a weight (e.g., a load, a payload) of the trailer 140 on the driven axle 137 based on the air pressure. Further, a user (e.g., an operator, a manager, a driver) can define a threshold weight (e.g., a weight limit, a weight standard) for each driven axle 137 and the controller 150 can leverage this threshold weight to adjust target regenerative braking proportional to the approximated weight of the trailer 140 on the driven axle 137.

For example, the controller 150 can interface with the integrated controller of the kingpin 110 to: detect a force applied to the kingpin by a hitch of a tow vehicle; detect a direction of motion of the trailer 140 (e.g., forward direction); and access a target preload force. The controller 150 can then: interpret a weight of the trailer 140 on the driven axle 137 (e.g., 34,500 pounds) based on the first combined air pressure; and, in response to the weight (e.g., 34,500 pounds) exceeding a threshold weight for the driven axle 137 (e.g., 34,000 pounds) and in response to the force exceeding the target preload force, trigger the set of latches 133 to disengage with corresponding engagement features 144 along the set of rails 147 in an open position; trigger the motor 131 to supply an electrical energy flux to the battery assembly 120 to regeneratively brake the driven axle 137 in the regenerative braking mode to redistribute the weight throughout the trailer 140; and trigger the set of latches 133 to engage corresponding engagement features 144 along the set of rails 147 in a closed position.

Therefore, the controller 150 can interpret air pressures from the air-ride suspension system of the trailer 140 and leverage these air pressures to trigger the motor 131 to disable torque output to the driven axle 137 and/or to regeneratively brake the driven axle 137 to adjust the longitudinal position of the bogie 130. Additionally, the controller 150 can leverage these air pressures to interpret a weight of the trailer on the driven axle 137 and trigger the motor 131 to regeneratively brake the driven axle 137 and apply a negative torque to the driven axle 137 to achieve a weight balance of the trailer 140 on the driven axle 137.

11. Variation: Service Mode

In one variation, the bogie 130 further includes a secondary battery assembly 122 mounted to the bogie chassis 132 of the bogie 130, and the controller 150 can trigger the secondary battery assembly 122 to supply electrical energy to the motor 131 to assist motion of the bogie 130 away from the trailer 140 and thus, enable a user to service the bogie 130 in a service mode.

For example, a user may wish to service the bogie 130 such as to: replace the motor 131 or the driven axle 137; clean the bogie 130; and/or remove and replace the bogie 130. The user may align the bogie 130 with the distal end 149 of the trailer 140 and manually disengage the set of latches 133 from corresponding engagement features 144 on the set of rails 147. Then, the controller 150 can: detect the set of latches 133 disengaged from the corresponding engagement features 144 on the left rail 147 and on the right rail 147; and, in response to the set of latches 133 disengaging from the corresponding engagement features 144, enter a service mode. In the service mode, the controller 150 can then trigger the secondary battery assembly 120 to supply electrical energy to the motor 131 to output torque to the driven axle 137 to assist motion of the bogie 130 away from the trailer 140 responsive to a user input. The user may then remove the bogie 130 from the floor 146 of the trailer 140 for service and then drive the serviced bogie 130 toward the proximal end 148 of the trailer 140 to engage the set of latches 133 with corresponding engagement features 144 on the set of rails 147. The user may drive the bogie 130 to a target longitudinal position to retain the bogie below the floor 146 of the trailer 140 and manually engage the clamp to prevent motion of the bogie 130 away from the trailer 140.

12. Modular Kit

Generally, the system 100 can include a modular kit 180. The modular kit 180 can be retrofit onto a trailer chassis of an existing trailer in order to enable detection of conditions of the existing trailer and to selectively transition between operational modes (e.g., a tow mode, a regenerative braking mode, a service mode) according to these conditions.

Figure 9:
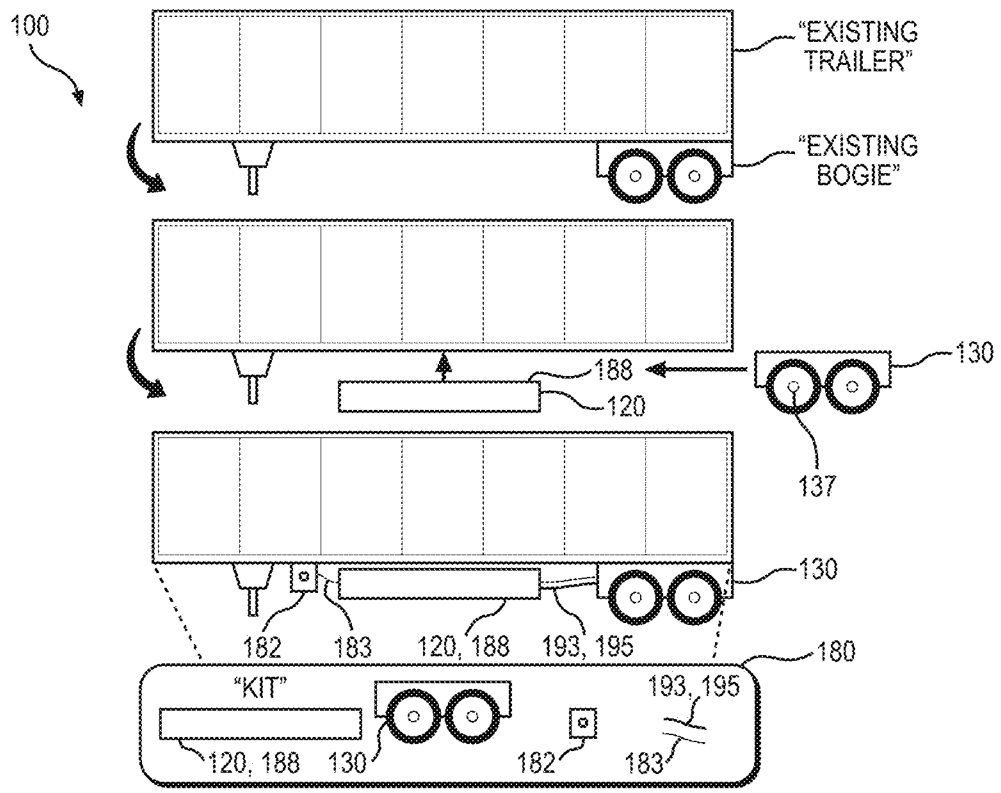
FIG. 9 is a schematic representation of one variation of the system.
Figure 10:
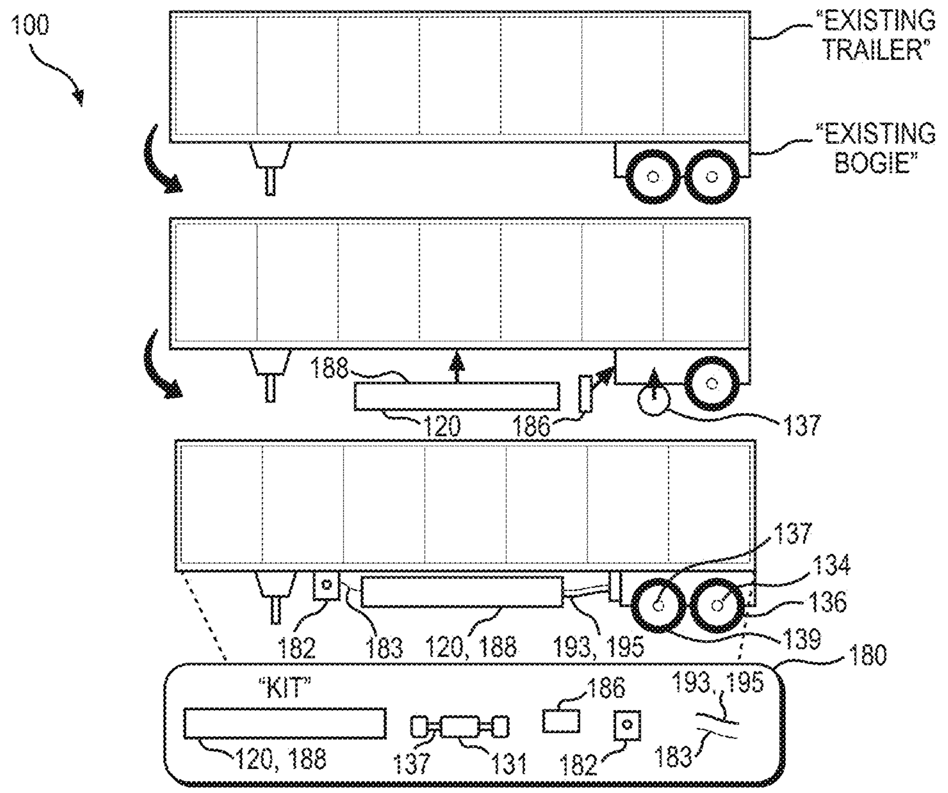
FIG. 10 is a schematic representation of one variation of the system.

In particular, the modular kit 180 can include a limited quantity of (e.g., five or six) components configured to install individually or in combination on various types of existing trailers (e.g., a dry vann trailer, a refrigerated trailer) with minimal or no disassembly of or irreversible modification to the existing trailer. In one implementation, the modular kit 180 includes: a charge port 182; a bogie module 130; a battery assembly 120; a set of electrical cables 183; a cable carrier 188; and a cooling module 190, as shown in FIG. 9. In another implementation, the modular kit 180 includes: a charge port 182; a motorized axle 137 (i.e., a motor 131 coupled to a driven axle 137); a battery assembly 120; a set of electrical cables 183; an electronics panel 186; a cable carrier 188; and a cooling module 190, as shown in FIG. 10.

12.1 Variation: Replacement of Existing Axle

As shown in FIG. 9, the modular kit 180 can include: a charge port 182; a driven axle 137; a motor 131 coupled to the driven axle 137; a battery assembly 120; a set of electrical cables 183; and a cable carrier 188. The charge port 182 is configured to install on a trailer and to receive electrical energy supplied by an external electrical system. The driven axle 137 is configured to install on the bogie chassis 132 supporting a trailer chassis of the trailer and the motor 131 is coupled to the driven axle 137.

The battery assembly 120: includes a set of retention features 185 configured to transiently engage a set of engagement features 144 on the trailer chassis to couple the battery assembly to the trailer chassis; is configured to receive electrical energy from the charge port 182; is configured to supply electrical energy to the motor 131 to drive the driven axle 137; and is configured to receive electrical energy from the motor 131 to regeneratively brake the driven axle 137. The set of electrical cables 183 are configured to electrically couple the motor 131 and the battery assembly 120.

The cable carrier 188 is configured to: locate between the bogie chassis 132 and the battery assembly 120; house the set of electrical cables 183; and support the set of electrical cables 183 over a range of longitudinal positions of the bogie chassis 132 relative to the battery assembly 120.

12.2 Variation: Cooling Module

Figure 11:
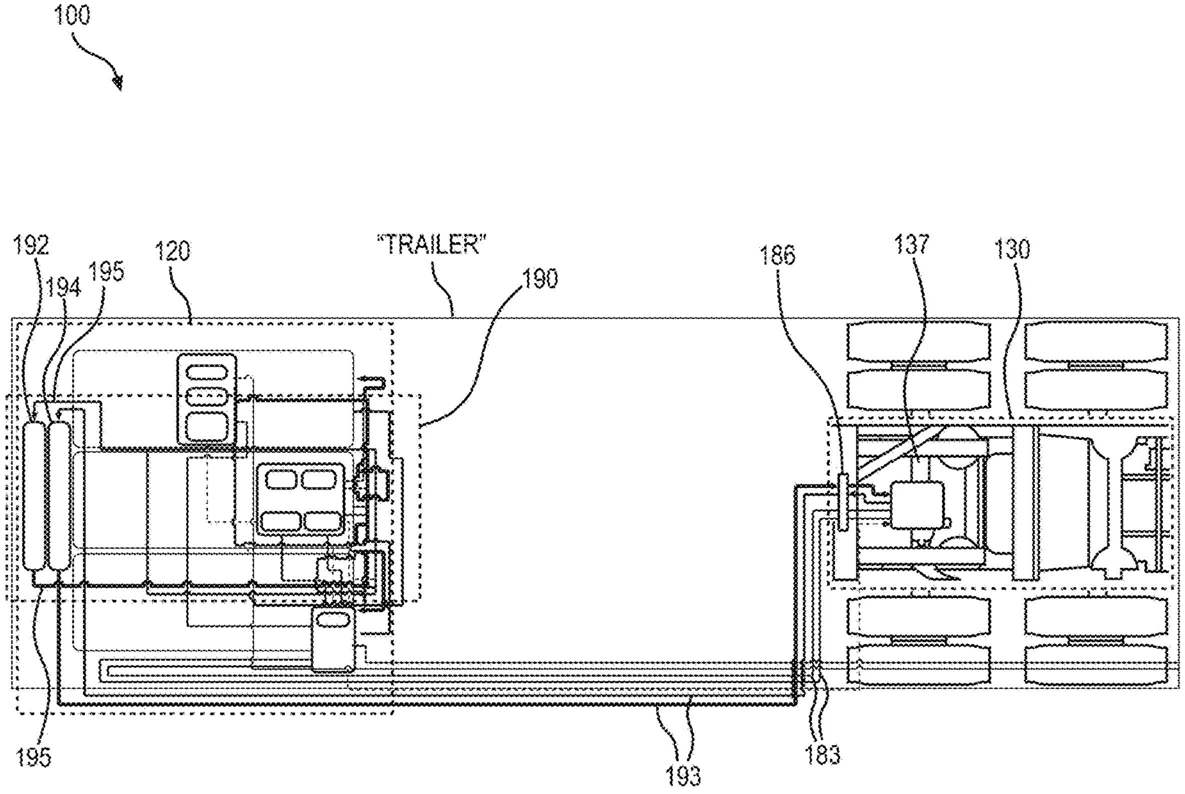
FIG. 11 is a schematic representation of one variation of the system.

As shown in FIG. 11, the modular kit 180 can include: a driven axle 137; a motor 131 coupled to the driven axle 137; a battery assembly 120; a set of electrical cables 183; a cable carrier 188; and a cooling module 190. The driven axle 137 is configured to install on the bogie chassis 132 supporting a trailer chassis of the trailer and the motor 131 is coupled to the driven axle 137.

The battery assembly 120: includes a set of retention features 185 configured to transiently engage a set of engagement features 144 on the trailer chassis to couple the battery assembly to the trailer chassis; is configured to receive electrical energy from the charge port 182; is configured to supply electrical energy to the motor 131 to drive the driven axle 137; and is configured to receive electrical energy from the motor 131 to regeneratively brake the driven axle 137. The set of electrical cables 183 are configured to electrically couple the motor 131 and the battery assembly 120.

The cable carrier 188 is configured to: locate between the bogie chassis 132 and the battery assembly 120; house the set of electrical cables 183; and support the set of electrical cables 183 over a range of longitudinal positions of the bogie chassis 132 relative to the battery assembly 120.

The cooling module 190 includes: a first radiator 192 fluidly coupled to the battery assembly 120 via a first coolant loop; and a second radiator 194 fluidly coupled to the motor 131.

12.3 Variation: Motorized Axle+Battery Assembly+Cable Carrier

As shown in FIG. 11, the modular kit 180 can include: a driven axle 137; a motor 131 coupled to the driven axle 137; a battery assembly 120; a set of electrical cables 183; and a cable carrier 188. The driven axle 137 is configured to install on the bogie chassis 132 supporting a trailer chassis of the trailer and the motor 131 is coupled to the driven axle 137.

The battery assembly 120: includes a set of retention features 185 configured to transiently engage a set of engagement features 144 on the trailer chassis to couple the battery assembly to the trailer chassis; is configured to receive electrical energy from the charge port 182; is configured to supply electrical energy to the motor 131 to drive the driven axle 137; and is configured to receive electrical energy from the motor 131 to regeneratively brake the driven axle 137. The set of electrical cables 183 are configured to electrically couple the motor 131 and the battery assembly 120.

The cable carrier 188 is configured to: locate between the bogie chassis 132 and the battery assembly 120; house the set of electrical cables 183; and support the set of electrical cables 183 over a range of longitudinal positions of the bogie chassis 132 relative to the battery assembly 120.

12. Charge Port

The modular kit 180 includes a charge port 182 configured to install on a trailer. The charge port 182 is configured to conductively couple to an external electrical system to receive electrical energy supplied by the external electrical system. The controller 150 can then route electrical energy to the battery assembly 120 in a charge mode and thus, charge the battery assembly 120.

In one implementation, the charge port 182 is arranged on a rigid panel and is configured to receive electrical energy supplied by an external electrical system—such as a power source (e.g., electrical grid power) of a depot, a warehouse, or a charging station of a loading dock. The rigid panel can further include a trailer port configured to receive an electrical cable 183 configured to electrically couple the charge port 182 to the battery assembly 120 to charge the battery assembly 120 in a charge mode.

For example, a first electrical cable 183 electrically couples the charge port 182 and the external electrical system, and a second electrical cable 183 electrically couples the trailer port and the battery assembly 120. Accordingly, the charge port 182 can receive electrical energy from the external electrical system via the first electrical cable. The controller 150 can then: distribute electrical energy from the trailer port, through the second electrical cable 183, and to the battery assembly 120 to recharge the battery assembly 120 in a charge mode.

Furthermore, the charge port 182 can exhibit a planar geometry to enable a user to install the charge port 182 below a floor or a trailer chassis of a trailer. Alternatively, the modular kit 180 can include a set of charge ports 182 (e.g., a CCS1 charge port, a J3068 charge port) configured to install on the trailer. However, the charge port 182 can exhibit any other geometry for installation onto a trailer chassis or a floor of any other type of trailer.

14. Battery Assembly

The battery assembly 120 includes a set of retention features 185 configured to transiently engage a set of engagement features 144 on the trailer chassis to couple the battery assembly 120 to the trailer chassis. In one implementation, the set of retention features 185 can include a set of brackets (e.g., a hanging bracket) configured to couple to the trailer chassis of the trailer. In another implementation, the set of retention features 185 can include a set of latches (e.g., an air pressure latch, a mechanical latch), or a set of solenoids (e.g., an electromechanical solenoid, a pneumatic solenoid), or another electromechanical latch operable in an engaged position and a disengaged position to transiently engage and/or disengage a corresponding engagement feature distributed along a set of rails of a trailer, as described above.

The battery assembly 120 is configured to: receive electrical energy from the charge port 182 in a charge mode; supply electrical energy to the motor 131 to drive the driven axle 137 in a tow mode; and receive electrical energy from the motor 131 to regeneratively brake the driven axle 137 in a regenerative braking mode. The battery assembly 120 can include a set of modular batteries configured to engage with each other and fit within a battery frame, as described above. The battery frame is configured to fit below a standard trailer chassis of a trailer. Thus, the set of modular batteries, enable a user: to quickly and repeatably install the battery assembly 120 or the set of modular batteries below a standard trailer chassis of any trailer; and to selectively adjust the battery capacity of the battery assembly 120 as a function of a predicted distance traveled by the trailer, a weight distribution of the trailer, and/or a type of the trailer (e.g., a dry vann trailer, a refrigerated trailer).

The battery assembly 120 can further include a local controller and a set of sensors to collect temperature data. In particular, the set of sensors can include: a set of temperature sensors configured to output signals representing temperatures of the battery assembly 120 to the local controller; and a temperature sensor configured to output signals representing temperatures of the external environment (e.g., ambient air proximal the battery assembly 120). The local controller is further configured to: trigger the battery assembly to supply electrical energy to the motor to output torque to the driven axle in the tow mode; and trigger the motor to supply electrical energy to the battery assembly to regeneratively brake the driven axle and recharge the battery assembly in the regenerative braking mode.

15. Electrical Cables

The set of electrical cables 183 can include a high-voltage power cable, a low-voltage power cable, an anti-lock braking system connection cable, or any other cable to electrically couple the battery assembly 120 and the driven axle

137. The set of electrical cables 183 are configured to run along the trailer chassis and the bogie chassis 132 of the trailer between the driven axle 137 and the battery assembly 120. Each cable 183 defines a length (e.g., 6 feet, 10 feet, 12 feet, 20 feet) proportional to a length of the trailer (e.g., 20 feet, 40 feet, 48 feet, 53 feet, 60 feet). Thus, a user (e.g., an installer, an operator, a fleet manager) may select a set of electrical cables 183 for the modular kit 180 as a function of a length of the trailer (e.g., 20 feet, 40 feet, 48 feet, 53 feet, 60 feet).

Furthermore, first and second ends of the cables 183 are configured to couple to the battery assembly 120 and the driven axle 137 via a set of connectors. For example, the set of connectors can include a set of "quick" connectors (e.g., automotive plastic quick-connects), or a set of dry-brake connectors. Thus, the set of connectors enable a user to repeatably connect and disconnect the set of electrical cables 183 between the battery assembly 120 and the motor 131 or between the battery assembly 120 and an electronics panel 186, as further described below.

16. Cable Carrier

The cable carrier 188 is configured to: locate between the bogie chassis 132 and the battery assembly 120; house the set of electrical cables 183; and support the set of electrical cables 183 over a range of longitudinal positions of the bogie chassis 132 relative to the battery assembly 120.

In one implementation, the cable carrier 188 includes: a first section configured to extend forward from the bogie chassis; a segmented conduit defining an omegoid profile (e.g., a u-shaped profile); and a spring. The segmented conduit includes a first end configured to couple to the first section of the cable carrier 188 and a second end configured to couple to the battery assembly 120. The segmented conduit is further configured to: coil forward toward a front end of the trailer to accommodate a first distance between the battery assembly 120 and the bogie chassis 132 in a first configuration; and uncoil rearward toward a rear end of the trailer to accommodate a second distance, greater than the first distance, between the battery assembly 120 and the bogie chassis 132 in a second configuration. The spring is configured to: bias the second section toward the first configuration; and release the second section toward the second configuration in response to tension applied to the cable carrier 188.

Thus, the cable carrier 188 can selectively increase or decrease the length of each electrical cable 183 running between the battery assembly 120 and the electronics panel 186 to prevent damage to the cables 183 while the trailer moves away from the bogie module 130 in a service mode or during installation.

17. Bogie Module

In one implementation, the bogie module 130 includes: a bogie chassis 132; a driven axle 137 suspended from the bogie chassis 132; and a motor 131 coupled to the driven axle 137. The bogie chassis 132 is configured to transiently install on a trailer over a range of longitudinal positions and supports the driven axle 137. The driven axle 137 is supported by an axle housing, suspended from the trailer chassis, and includes a left driven wheel 138 and a right driven wheel 139. The axle housing further encapsulates a motor 131 mounted to the driven axle 137 and is configured to protect the driven axle 137 and the motor 131. The motor 131 is configured to drive the left driven wheel 138 and the right driven wheel 139 and thus, output torque in a tow mode. The motor 131 is further configured to regeneratively brake the left driven wheel 138 and the right driven wheel 139 to slow motion of the trailer and recharge the battery assembly 120 in a regenerative braking mode.

Furthermore, the bogie chassis 132 can be manufactured from a metal such as galvanized steel or stainless steel and coupled to the floor of the trailer. Additionally, the bogie chassis 132 can be mounted to the floor 146, such as by welding the bogie chassis 132 to the floor of the trailer or bolting the bogie chassis 132 to the floor of the trailer via a set of fasteners.

The driven axle 137 can further include a suspension system (e.g., a leaf suspension system, a rubber block suspension system, or an air-ride suspension system coupled to the driven axle 137) and a compressed-air-brake system, as described above. The bogie module 130 can further include a set of sensors to collect temperature data. In particular, the set of sensors can include: a set of temperature sensors configured to output signals representing temperatures of the motor 131; and an ambient temperature sensor configured to output signals representing temperatures of the external environment (e.g., ambient air) proximal the motor 131.

17.1 Electronics Panel

In one implementation, the modular kit 180 includes an electronics panel 186 (e.g., a bulkhead assembly) and a motorized axle 137 (i.e., a motor 131 coupled to a driven axle 137). The electronics panel 186 is configured to install on the bogie chassis 132. In this implementation, the set of electrical cables 183 are configured to electrically couple the battery assembly 120 to the motor 131 via the electronics panel 186.

Furthermore, the electronics panel 186 includes: a local controller; a suspension pressure sensor configured to fluidly couple to an air-ride suspension system suspending the driven axle 137 from the bogie chassis 132; and a brake pressure sensor configured to fluidly couple to an air brake system arranged on the driven axle 137 or to fluidly couple to an air emergency brake line, arranged proximal the driven axle 137, from the tow vehicle. Each pressure sensor is configured to output signals representing a pressure in the air-ride suspension system, the air brake system, and/or the air emergency brake line. The local controller can then transition between the regenerative braking mode and the maximum regenerative braking mode according to pressures detected by these pressure sensors.

In one variation, the electronics panel 186 includes: a local controller; an inertial sensor (e.g., an IMU, an accelerometer, a gyroscope); a coolant pump 198; and a set of sensors coupled to an anti-locking braking system of the tow vehicle. The local controller can access signals output from sensors coupled to the anti-lock braking system of the tow vehicle to automatically trigger the motor 131 to apply a braking force to the driven axle 137 via the pneumatic or mechanical brake system of the trailer 140 and/or via regenerative braking. Additionally, the local controller can further: access signals output from the set of wheel speed sensors, coupled to the driven axle 137, to track traction between the driven wheels of the driven axle 137 and a ground surface; and trigger the motor 131 to regeneratively brake the driven axle 137, as described above.

18. Cooling Module

The cooling module 190 includes: a set of radiators 192, 194; a set of valves 196; a set of coolant pumps 198; and a set of coolant loops 193, 195. The set of radiators include a first radiator 192 fluidly coupled to the battery assembly 120 via a first coolant loop 193 and a second radiator 194 fluidly coupled to the motor 131 via a second coolant loop 195. The first radiator 192 is configured to transfer thermal energy absorbed by coolant flowing through the first coolant loop 193 from the battery assembly 120 to ambient (e.g., ambient environment, external environment). The second radiator 194 is configured to transfer thermal energy absorbed by coolant flowing through the second coolant loop 195 from the motor 131 to ambient.

In one implementation, the coolant module includes: a first radiator 192 fluidly coupled to the battery assembly 120 via a first coolant loop 193; and a second radiator 194 fluidly coupled to the motor 131 via a second coolant loop 195. The first radiator 192 defines: a first coolant inlet configured to receive coolant, outbound from the battery assembly 120, from the first coolant loop 193 at a first temperature; and a first coolant outlet configured to return coolant, at a second temperature less than the first temperature, into the first coolant loop 193 toward the battery assembly 120 to cool the battery assembly 120. The second radiator 194 defines: a second coolant inlet configured to receive coolant, outbound from the motor 131 at a third temperature, from the second coolant loop 195; and a second coolant outlet configured to return coolant, at the second temperature, into the second coolant loop 195 to cool the motor 131 as shown in FIG. 11.

The cooling module 190 can further include a set of fans mounted to the first and second radiators 192, 194, respectively. For example, a first fan is mounted to the first radiator 192 and is configured to dissipate heat from coolant flowing through the first coolant loop 193 from the battery assembly 120 to ambient (e.g., ambient external environment). A second fan is mounted to the second radiator 194 and is configured to dissipate heat from coolant flowing through the second coolant loop 195 from the motor 131 to ambient.

Figure 12:
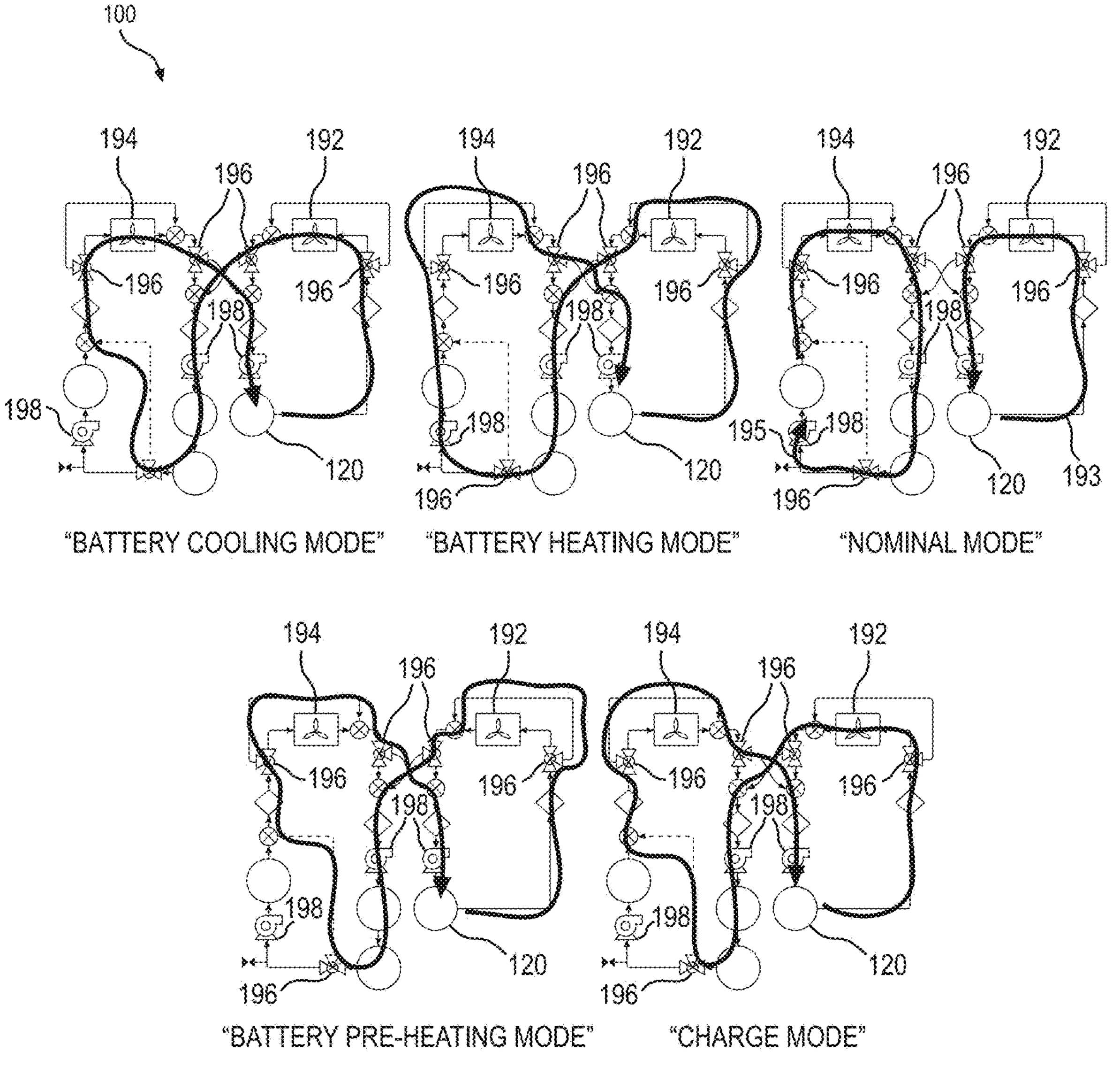
FIG. 12 is a schematic representation of one variation of the system.

Additionally, the cooling module 190 can include a set of temperature sensors configured to output signals representing temperatures of coolant within the first and second coolant loops 193, 195. The controller 150 can trigger the set of valves 196 to route coolant between the set of radiators 192, 194, the motor 131, and/or the battery assembly 120 to cool or heat the motor 131 and/or the battery assembly 120, as shown in FIG. 12.

18.1 Radiator Configurations

In one variation, the first radiator 192: is mounted to the trailer chassis; and is fluidly coupled to the battery assembly 120 via the first coolant loop 193. The second radiator 194: is mounted to the trailer chassis interposed between the first radiator and the battery assembly 120; and is fluidly coupled to the motor 131 via the second coolant loop 195.

In another variation, the first radiator 192: is mounted to the trailer chassis proximal the battery assembly 120; and is fluidly coupled to the battery assembly 120 via the first coolant loop 193. The second radiator 194: is mounted to the first radiator 192 to form a vertical stack; and is fluidly coupled to the motor 131 via the second coolant loop 195.

In yet another variation, the first radiator 192 is mounted to the battery assembly 120 and fluidly coupled to the battery assembly 120 via the first coolant loop 193. The second radiator 194 is mounted to the trailer chassis and fluidly coupled to the motor 131 via the second coolant loop 195. In this variation, the first coolant loop 193 includes a first coolant line (e.g., a coolant hose) fluidly coupling the first radiator 192 to the battery assembly 120. The first coolant loop defines: a first end coupled to a coolant inlet of the first radiator 192; and a second end coupled to a coolant outlet of the first radiator 192.

The second coolant loop 195 includes a second coolant line (e.g., a coolant hose) fluidly coupling the second radiator 194 and the motor 131. The second coolant line includes a flexible section supported by and arranged within the cable carrier 188 adjacent segments of the set of electrical cables 183. The flexible section: defines an omegoid profile (e.g., a u-shaped profile); includes a first end configured to couple to the first section of the cable carrier 188; and includes a second end configured to couple to the motor 131. The flexible section is further configured to: coil forward toward a front end of the trailer to accommodate a first distance between the battery assembly 120 and the bogie chassis 132 in a first configuration; and uncoil rearward toward a rear end of the trailer to accommodate a second distance, greater than the first distance, between the battery assembly 120 and the bogie chassis 132 in a second configuration. The spring in the cable carrier 188 is configured to bias the flexible section toward the first configuration and release the flexible section toward the second configuration responsive to tension applied to the cable carrier 188.

Thus, the cable carrier 188 can selectively increase or decrease the length of the second coolant line running between the second radiator 194 and the motor 131 to prevent damage to the second coolant line while the trailer moves relative to the bogie module 130 in a service mode or during installation.

18.2 Pumps+Valves

The set of coolant pumps 198 can include a coolant pump 198 arranged proximal (e.g., nearby, within a threshold distance of) the battery assembly 120 and configured to circulate coolant between the battery assembly 120 and the first radiator 192. The set of coolant pumps 198 can further include a second coolant pump 198, arranged proximal the motor 131, and configured to circulate coolant between the motor 131 and the second radiator 194. Alternatively, the motor 131 can include an integrated coolant pump 198 configured to circulate coolant between the motor 131 and the second radiator 194.

The set of valves 196 are configured to operate in a set of modes (e.g., a nominal mode, a battery heating mode, a motor heating mode, a battery cooling mode, a motor cooling mode, a charge mode): to selectively fluidly couple the battery assembly 120 to the first radiator 192 and the motor 131 to the second radiator 194 (or neither); to selectively fluidly couple the motor 131 to the first radiator 192 and the second radiator 194; to selectively fluidly couple the battery assembly 120 to the first radiator 192 and the second radiator 194; and to selectively fluidly couple the motor 131 to the first radiator 192, the second radiator 194, and the battery assembly 120.

In one implementation, the set of valves 196 includes a set of three-way valves 196 (e.g., tri-state valves 196) coupled to the first and second coolant loops 193, 195 and configured to route coolant between the first and second coolant loops 193, 195. In another implementation, the set of valves 196 includes a set of four-way valves 196 configured to fluidly couple the first coolant loop 193 and the second coolant loop 195. The set of valves 196 can include electromechanical solenoid valves; rotary valves; ball valves; check valves; gate valves; stop valves; butterfly valves; etc.

19. Installation of Modular Kit

In one implementation, an existing trailer includes a trailer chassis, a set of rails coupled to the trailer chassis, a vehicle coupler coupled to a front end of the existing trailer, a bogie transiently installed on a rear end of the existing trailer, and a set of side skirts (e.g., aerodynamic fairings) installed onto the set of rails. The set of rails can run along a longitudinal axis of the trailer, extending parallel to and laterally offset from a longitudinal centerline, to form a channel below the trailer chassis. A user (e.g., a manufacturer, an installer, a fleet manager) may retrofit the modular kit 180 onto the trailer chassis and the set of rails of the existing trailer.

19.1 Installation of Bogie Module

In one example, the modular kit 180 includes: a charge port 182; a bogie module 130; a battery assembly 120; a set of electrical cables 183; a cable carrier 188; and a cooling module 190.

Furthermore, the user may remove an existing bogie module arranged below the existing trailer and install the battery assembly 120 by: locating the battery assembly 120 below the trailer chassis of the existing trailer; and manually engaging the set of retention features 185 (e.g., a set of hanging brackets) of the battery assembly 120 with corresponding engagement features 144 on the set of rails to couple the battery assembly 120 to the trailer chassis proximal a front end of the existing trailer. The user may then install the bogie module 130 on the existing trailer by: locating the bogie module 130 below the trailer chassis proximal (e.g., nearby, within a threshold distance of) a rear end of the existing trailer; and manually mounting the bogie chassis 132 to the trailer chassis of the existing trailer (or engaging the set of latches 133 with corresponding engagement features 144 on the set of rails) to couple the bogie module 130 to the trailer chassis of the existing trailer. The user may: install the charge port 182 under the trailer chassis of the existing trailer proximal the front end of the existing trailer, adjacent the vehicle coupler, such that the charge port 182 faces an aperture in a side skirt suspended from the trailer chassis. Thus, the charge port 182 can receive an electrical cable 183 through the aperture in the side skirt from the external electrical system and charge the battery assembly 120 via the electrical cable 183 in a charge mode.

The user may then install a set of electrical cables 183 (e.g., a high-voltage power chain, a low-voltage power chain, an anti-locking braking system connection cable) to electrically couple the charge port 182 to the battery assembly 120, and the battery assembly 120 to the motor 131. The user may further install a set of coolant lines (e.g., a coolant loop, a coolant hose): to fluidly couple a low-temperature radiator, arranged within the cooling module 190 to the battery assembly 120; and to fluidly couple a high-temperature radiator, arranged within the cooling module 190, to the motor 131.

19.2 Installation of Driven Axle on Existing Bogie Chassis

In another example, the user (e.g., a manufacturer, an installer) may retrofit the modular kit 180 onto the trailer chassis and an existing bogie chassis arranged below the existing trailer. In this example, the modular kit 180 includes: a charge port 182; a motorized axle (i.e., a motor 131 coupled to a driven axle 137); a battery assembly 120; a set of electrical cables 183; a cable carrier 188; an electronics panel 186 (e.g., a bulkhead assembly); and a cooling module 190. The user may remove a front axle from the existing bogie chassis and replace the front axle with the motorized axle (i.e., a motor 131 coupled to the driven axle 137).

The user may then mount the electronics panel 186 (e.g., a bulkhead assembly)—housing a local controller 150 and a set of sensors- to the existing bogie chassis. The user may install the battery assembly 120 by: locating the battery assembly 120 below the trailer chassis of the existing trailer; and manually engaging a set of retention features 185 of the battery assembly 120 with corresponding engagement features 144 on a set of rails to couple the battery assembly 120 to the trailer chassis of the existing trailer. The user may mount the charge port 182 to the trailer chassis of the existing trailer proximal a front end of the existing trailer, adjacent the vehicle coupler, such that the charge port 182 faces an aperture in a side skirt suspended from the existing trailer. The user may further install the cooling module 190 proximal the battery assembly 120.

Accordingly, the user may then: connect an electrical cable 183 between the charge port 182 and the battery assembly 120; and connect the set of electrical cables 183 to the battery assembly 120 and the electronics panel 186. The user may further install a set of coolant lines (e.g., a coolant loop, a coolant hose): to fluidly couple a low-temperature radiator, arranged within the cooling module 190, to the battery assembly 120; and to fluidly couple a high-temperature radiator, arranged within the cooling module 190, to the motor 131.

19.3 Example Configurations

Generally, a user (e.g., a manufacturer, an installer, a fleet manager) or machine may select a modular kit 180 for installation below a floor of an existing trailer as a function of a type of the existing trailer (e.g., a dry vann trailer, a refrigerated trailer), a length of the existing trailer (e.g., 20 feet, 40 feet, 48 feet, 53 feet, 60 feet), and/or a weight distribution of the existing trailer.

In one example, a user selects a modular kit 180 containing: a charge port 182; a battery assembly 120; a bogie module 130; and a cable carrier 188. The user: arranges the charge port 182 below the trailer chassis proximal a front end of the existing trailer; manipulates the bogie chassis 132 along a longitudinal axis of the existing trailer to arrange the bogie module 130 below the trailer chassis proximal a rear end of the existing trailer; locates the battery assembly 120, interposed between the front end of the existing trailer and the bogie module 130; and arranges the cable carrier 188 between the bogie chassis and the battery assembly 120.

In another example, the user selects a modular kit 180 containing: a charge port 182; a motorized axle 137 (e.g., a motor 131 coupled to a driven axle 137); a battery assembly 120; an electronics panel 186; and a cooling module 190. The user then: arranges the charge port 182 below the trailer chassis on a front end of the existing trailer; locates and installs the driven axle 137 below the existing bogie chassis proximal a rear end of the existing trailer; couples the electronics panel 186 to the trailer chassis, proximal the driven axle 137; arranges the battery assembly 120 interposed between the front end and the driven axle 137; and arranges the cooling module 190 below the trailer chassis interposed between the front end of the existing trailer and the battery assembly 120.

Thus, the modular kit 180 enables a user to select and quickly install (e.g., retrofit) a limited quantity of components onto an existing trailer according to a gross weight limit of the existing trailer, a target weight distribution of the existing trailer, and/or a type of existing trailer.

20. Thermal Energy Management

Generally, the controller 150, integrated into the cooling module 190, can augment heating and cooling of the motor 131 and the battery assembly 120 to maintain the motor 131 and the battery assembly 120 within operating temperature ranges and thus reduce fuel or electrical energy consumed by a tractor hauling the trailer. In particular, the controller 150 can: monitor temperatures of the battery assembly 120 and the motor 131 (e.g., via temperature sensors); and trigger the set of valves 196 to route coolant between the set of radiators, the motor 131, and/or the battery assembly 120 to cool or heat the motor 131 and/or the battery assembly 120. For example, the controller 150 can cooperate with the set of valves 196 to direct thermal energy from the motor 131 to the battery assembly 120 to pre-heat the battery assembly 120 while the trailer is docked and prior to entering a tow mode.

Furthermore, the controller 150 can access an operating temperature range for the battery assembly 120, specified by a manufacturer. The controller can further access a second operating temperature range for the motor 131, specified by a manufacturer. In one variation, a user may define a battery temperature range for the battery assembly and a motor temperature range for the motor via a user interface. The controller 150 can then retrieve the battery temperature range and the motor temperature range from the user interface. In another variation, the controller 150 can track the temperature of the battery assembly 120 and the motor 131 over time via the temperature sensors while a tow vehicle hauling the trailer executes a drive route. The controller 150 can then: calculate an average temperature of the battery assembly during the drive route; and define a battery temperature range within a tolerance range (e.g., a tolerance range of +/−five degrees, +/−two degrees) of the average temperature of the battery assembly. The controller 150 can repeat these methods and techniques for the motor 131 to define a motor temperature range.

20.1 Nominal Mode

In one implementation, the controller 150 transitions the set of valves 196 to a nominal mode: to direct coolant from the first radiator 192 to the battery assembly 120; and to direct coolant from the second radiator 194 to the motor 131 to cool the battery assembly 120 and the motor 131.

In one variation, the controller 150: detects temperatures of the battery assembly 120 and the motor 131 via temperature sensors; and transitions the set of valves 196 to the nominal mode according to the temperatures of the battery assembly 120 and the motor 131. For example, the controller 150 can: receive a first signal output by a temperature sensor arranged within the battery assembly 120; receive a second signal output by a temperature sensor arranged proximal the motor 131; interpret a first temperature of the battery assembly 120 based on the first signal; and interpret a second temperature of the battery assembly 120 based on the second signal.

Then, in response to the first temperature of the battery assembly falling within a battery temperature range and in response to the second temperature of the motor falling within the motor temperature range, the controller 150 can trigger the set of valves 196 to transition to the nominal mode. In the nominal mode, the set of valves 196 can: route a first volume of coolant through the first coolant loop 193 to dissipate heat from the battery assembly 120 to ambient; and route a second volume of coolant through the second coolant loop 195 to dissipate heat from the motor 131 to ambient.

Therefore, the controller 150 can trigger the set of valves 196 to transition to the nominal mode in order to isolate the first coolant loop 193 from the second coolant loop 195. The controller 150 further cooperates with the set of valves 196 to maintain temperatures of the battery assembly 120 and the motor 131 within operating temperature ranges by: selectively directing coolant, in the first coolant loop 193, to the battery assembly 120; and selectively directing coolant, in the second coolant loop 195, to the motor 131.

20.2 Battery Heating Mode+Motor Heating Mode

In one implementation, the controller 150 triggers the set of valves 196 to direct thermal energy, absorbed by the coolant, from the motor 131 to the battery assembly 120 and thus, heat the battery assembly 120 in a battery heating mode. Alternatively, the controller 150 triggers the set of valves 196 to direct thermal energy, absorbed by the coolant, from the battery assembly 120 to the motor 131 and thus, heat the motor 131 in a motor heating mode.

In one variation, the controller 150 implements methods and techniques described above to interpret a first temperature of the battery assembly 120 and a second temperature of the motor 131 via the set of temperature sensors. Then, in response to the first temperature of the battery assembly 120 exceeding the battery temperature range, and in response to detecting the second temperature of the motor 131 falling within the motor temperature range, the controller 150 triggers the set of valves 196 to transition to the battery heating mode. In the battery heating mode, the set of valves 196 are configured to: intermix the first volume of coolant and the second volume of coolant; and route coolant from the motor 131 to the battery assembly 120 to heat the battery assembly 120. In one example, in the battery heating mode, the set of valves 196 are configured to: fluidly couple the battery assembly 120 to the motor 131; intermix the first volume of coolant and the second volume of coolant; and route coolant from the motor 131 to the battery assembly 130 while bypassing the first radiator 192 and the second radiator 194. In another example, the set of valves 196 are configured to: fluidly couple the battery assembly 120 to the motor 131; intermix the first volume of coolant and the second volume of coolant; and route coolant from the motor 131 to the battery assembly 130 while bypassing the second radiator 194, as shown in FIG. 12.

Alternatively, in response to the first temperature of the battery assembly falling within the battery temperature range, and in response to the second temperature of the motor falling below the motor temperature range, the controller 150 can trigger the set of valves 196 to transition to the battery heating mode. In the battery heating mode, the set of valves 196 are configured to: intermix the first volume of coolant and the second volume of coolant; and route coolant from the battery assembly 120 to the motor 131 to heat the motor 131.

Therefore, the controller 150 can monitor temperatures of the battery assembly 120 and the motor 131 and selectively trigger the set of valves 196 to transition to the battery heating mode or the motor heating mode. Additionally, the controller 150 can trigger the set of valves 196 to direct thermal energy, absorbed by coolant flowing through the first and second coolant loops 193, 195 to the battery assembly 120 in the battery heating mode or to the motor 131 in the motor heating mode.

20.3 Battery Cooling Mode+Motor Cooling Mode

In one implementation, in a battery cooling mode, the controller 150 triggers the set of valves 196 to direct coolant from the first radiator 192 and the second radiator 194 to the battery assembly 120 in order to cool the battery assembly 120. Alternatively, in a motor 131 cooling mode, the controller 150 triggers the set of valves 196 to direct coolant from the first radiator 192 and the second radiator 194 to the motor 131. Further, the controller 150 triggers the set of valves 196 to a set of positions in order to direct coolant from the battery assembly 120 or the motor 131 to the first radiator 192 and the second radiator 194.

In one variation, the controller 150 implements methods and techniques described above to detect a first temperature of the battery assembly 120 and detect a second temperature of the motor 131. Then, in response to the first temperature of the battery assembly 120 exceeding the battery temperature range and in response to the second temperature of the motor 131 falling below the motor temperature range, the controller 150 transitions the set of valves 196 to the battery cooling mode. In the battery cooling mode, the set of valves 196 are configured to: route the first volume of coolant from the first radiator 192 to the battery assembly 120; and route the second volume of coolant from the second radiator 194 to the battery assembly 120 to cool the battery assembly 120.

Alternatively, in response to the first temperature of the battery assembly 120 falling below the battery temperature range and in response to the second temperature of the motor 131 exceeding the motor temperature range, the controller 150 can: transition the set of valves 196 to a motor cooling mode. In the motor cooling, the set of valves 196 are configured to: route the first volume of coolant from the first radiator 192 to the motor 131; and route the second volume of coolant to the motor 131 while bypassing the second radiator 194 to cool the motor 131.

Therefore, in the battery cooling mode, the controller 150 can trigger the set of valves 196 to direct coolant from the first radiator 192 and the second radiator 194 to rapidly cool the battery assembly 120. Additionally, in the motor cooling mode, the controller 150 can cooperate with the set of valves 196 to direct coolant from the first radiator 192 to rapidly cool the motor 131.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A kit comprising:
a charge port:
configured to install on a trailer; and
configured to receive electrical energy supplied by an external electrical system;
a driven axle configured to install on a bogie chassis supporting a trailer chassis of the trailer;
a motor coupled to the driven axle;
a battery assembly:
comprising a set of retention features configured to transiently engage a set of engagement features on the trailer chassis to couple the battery assembly to the trailer chassis;
configured to receive electrical energy from the charge port;
configured to supply electrical energy to the motor to drive the driven axle; and
configured to receive electrical energy from the motor to regeneratively brake the driven axle;
a set of electrical cables configured to electrically couple the motor and the battery assembly; and
a cable carrier configured to:
locate between the bogie chassis and the battery assembly;
house the set of electrical cables; and
support the set of electrical cables over a range of longitudinal positions of the bogie chassis relative to the battery assembly.

2. The kit of claim 1:
further comprising a bogie module comprising:
the bogie chassis configured to transiently install on the trailer chassis over a range of longitudinal positions;
the driven axle suspended from the bogie chassis; and
a set of latches configured to transiently engage the set of engagement features on the trailer chassis to couple the bogie module to the trailer chassis; and
wherein in a first configuration:
the charge port is arranged below the trailer chassis proximal a front end of the trailer;
the bogie module is arranged below the trailer chassis proximal a rear end of the trailer; and
the battery assembly is interposed between the front end of the trailer and the bogie module.

3. The kit of claim 1, wherein the cable carrier comprises:
a first section configured to extend forward from the bogie chassis;
a segmented conduit:
defining an omegoid profile;
comprising:
a first end configured to couple to the first section of the cable carrier; and
a second end configured to couple to the battery assembly;
configured to coil forward toward a front end of the trailer to accommodate a first distance between the battery assembly and the bogie chassis in a first configuration; and
configured to uncoil rearward toward a rear end of the trailer to accommodate a second distance, greater than first distance, between the battery assembly and the bogie chassis in a second configuration; and
a spring configured to:
bias the first section toward the first configuration; and
release the first section toward the second configuration in response to tension applied to the cable carrier.

4. The kit of claim 1:
further comprising an electronics panel:
comprising:
a controller;
a suspension pressure sensor; and
a brake pressure sensor; and
configured to install on the bogie chassis; and
wherein the set of electrical cables are configured to electrically couple the battery assembly to the motor via the electronics panel.

5. The kit of claim 4:
wherein the suspension pressure sensor is configured to fluidly couple to an air-ride suspension system suspending the driven axle from the bogie chassis;
wherein the brake pressure sensor is configured to fluidly couple to an air brake system arranged on the driven axle; and wherein the controller is further configured to:
set a regenerative braking limit at the driven axle based on a pressure, in the air-ride suspension system, detected via the suspension pressure sensor; and
trigger the motor to regeneratively brake the driven axle in response to detecting an increase in pressure in the air brake system via the brake pressure sensor.

6. The kit of claim 4:
wherein the brake pressure sensor is configured to fluidly couple to an air emergency brake line from a tow vehicle and proximal the driven axle; and
wherein the controller is further configured to:
detect a second pressure, in the air emergency brake line, via the brake pressure sensor;
transition to a maximum regenerative braking mode in response to the second pressure exceeding a threshold air pressure; and
trigger the motor to supply a maximum electrical energy flux to the battery assembly in the maximum regenerative braking mode:
to regeneratively brake the driven axle; and
to charge the battery assembly.

7. The kit of claim 1, wherein the battery assembly further comprises a controller configured to:
in a tow mode, trigger the battery assembly to supply electrical energy to the motor to output torque to the driven axle; and
in a regenerative braking mode, trigger the motor to supply electrical energy to the battery assembly to regeneratively brake the driven axle and recharge the battery assembly.

8. The kit of claim 1, wherein the charge port is configured to:
install under the trailer chassis of the trailer; and
face an aperture in a side skirt suspended from the trailer chassis.

9. The kit of claim 1, further comprising a cooling module comprising:
a first radiator configured to:
fluidly couple to the battery assembly via a first coolant loop; and
transfer thermal energy, absorbed by coolant flowing through the first coolant loop, from the battery assembly to ambient;
a second radiator configured to:
fluidly couple to the motor via a second coolant loop; and
transfer thermal energy, absorbed by coolant flowing through the second coolant loop, from the motor to ambient; and
a first pump configured to circulate coolant through the first coolant loop.

10. The kit of claim 9, wherein the cooling module further comprises:
a set of valves configured to operate in:
a nominal mode with the set of valves configured to:
route a first volume of coolant through the first coolant loop to dissipate heat from the battery assembly to ambient; and
route a second volume of coolant through the second coolant loop to dissipate heat from the motor to ambient; and
a battery heating mode with the set of valves configured to:
intermix the first volume of coolant and the second volume of coolant; and
route coolant from the motor to the battery assembly to heat the battery assembly.

11. The kit of claim 9, wherein the cable carrier is further configured to:
house the first coolant loop and the second coolant loop; and
support the first coolant loop and the second coolant loop over a range of longitudinal positions of the bogie chassis relative to the battery assembly.

12. The kit of claim 1:
further comprising a vehicle coupler:
configured to:
install on a front end of the trailer; and
transiently couple to a hitch of a tow vehicle; and
comprising a set of sensors configured to output signals representing forces applied to the vehicle coupler; and
further comprising a controller configured to:
detect a first force applied to the kingpin by the hitch via the set of sensors;
detect a first direction of motion of the trailer in a forward direction;
detect a first incline angle of the trailer;
detect a first charge state of the battery assembly;
calculate a first target preload force opposite the first direction of motion and inversely proportional to the first incline angle and the first charge state; and
in response to the first force falling below the first target preload force, trigger the motor in a tow mode:
to increase torque output in the first direction of motion; and
to decrease a first difference between the first force and the target preload force in a tow mode.

13. The kit of claim 12, wherein the controller is further configured to:
detect a second force applied to the kingpin by the hitch via the set of sensors;
detect a second direction of motion of the trailer in the forward direction;
detect a second decline angle of the trailer;
detect a second charge state of the battery assembly;
calculate a second target preload force opposite the second direction of motion and proportional to the second decline angle; and
in response to the second force exceeding the second target preload force, trigger the motor to regeneratively brake the driven axle in a regenerative braking mode:
to charge the battery assembly; and
to decrease a second difference between the second force and the second target preload force.

14. A kit comprising:
a driven axle configured to install on a bogie chassis supporting a trailer chassis of a trailer;
a motor coupled to the driven axle;
a battery assembly:
comprising a set of retention features configured to transiently engage a set of engagement features on the trailer chassis to couple the battery assembly to the trailer chassis;
configured to supply electrical energy to the motor to drive the driven axle; and
configured to receive electrical energy from the motor to regeneratively brake the driven axle;
an electrical cable configured to electrically couple the motor and the battery assembly;
a cable carrier configured to:

locate between the bogie chassis and the battery assembly;

house the electrical cable; and support the electrical cable over a range of longitudinal positions of the bogie chassis relative to the battery assembly; and a cooling module comprising:

a first radiator configured to fluidly couple to the battery assembly via a first coolant loop; and a second radiator configured to fluidly couple to the motor via a second coolant loop.

15. The kit of claim 14:

wherein the second radiator is configured to install on the trailer chassis;

wherein the cable carrier further comprises a first section configured to extend forward from the bogie chassis; and further comprising a second coolant line:

fluidly coupling the second radiator and the motor; and comprising a flexible section:

supported by and arranged within the cable carrier adjacent a segment of the electrical cable;

defining an omegoid profile;

comprising:

a first end configured to couple to the first section of the cable carrier; and a second end configured to couple to the motor;

configured to coil forward toward a front end of the trailer to accommodate a first distance between the battery assembly and the bogie chassis in a first configuration; and configured to uncoil rearward toward a rear end of the trailer to accommodate a second distance, greater than first distance, between the battery assembly and the bogie chassis in a second configuration.

16. The kit of claim 14:

wherein the first radiator is configured to transfer thermal energy, absorbed by coolant flowing through the first coolant loop, from the battery assembly to ambient;

wherein the second radiator is configured to transfer thermal energy, absorbed by coolant flowing through the second coolant loop, from the motor to ambient; and wherein the cooling module further comprises:

a first pump configured to circulate coolant through the first coolant loop; and a second pump configured to circulate coolant through the second coolant loop.

17. The kit of claim 14, wherein the cooling module further comprises a set of valves configured to operate in:

a nominal mode with the set of valves configured to:

route a first volume of coolant through the first coolant loop to dissipate heat from the battery assembly to ambient; and route a second volume of coolant through the second coolant loop to dissipate heat from the motor to ambient;

a motor heating mode with the set of valves configured to:

intermix the first volume of coolant with the second volume of coolant; and route coolant from the battery assembly to the motor to heat the motor; and a battery heating mode with the set of valves configured to:

intermix the first volume of coolant and the second volume of coolant; and route coolant from the motor to the battery assembly to heat the battery assembly.

18. The kit of claim 17:

wherein the battery assembly comprises a first temperature sensor;

wherein the motor comprises a second temperature sensor;

wherein the battery assembly further comprises a controller configured to:

trigger the set of valves to transition to the nominal mode:

in response to detecting a first temperature of the battery assembly falling within a battery temperature range via the first temperature sensor; and in response to detecting a second temperature of the motor falling within a motor temperature range via the second temperature sensor;

trigger the set of valves to transition to the motor heating mode:

in response to detecting a third temperature of the battery assembly falling within the battery temperature range via the first temperature sensor; and in response to detecting a fourth temperature of the motor falling below the motor temperature range via the second temperature sensor; and trigger the set of valves to transition to the battery heating mode:

in response to detecting a fifth temperature of the battery assembly exceeding the battery temperature range via the first temperature sensor; and in response to detecting a sixth temperature of the motor falling within the motor temperature range via the second temperature sensor.

19. The kit of claim 14:

further comprising a charge port configured to:

install under the trailer chassis of the trailer;

face an aperture in a side skirt suspended from the trailer chassis; and receive electrical energy supplied by an external electrical system; and wherein the battery assembly is further configured to receive electrical energy from the charge panel.

20. A kit comprising:

a driven axle configured to install on a bogie chassis supporting a trailer chassis of a trailer;

a motor coupled to the driven axle;

a battery assembly:

comprising a set of retention features configured to transiently engage a set of engagement features on the trailer chassis to couple the battery assembly to the trailer chassis;

configured to supply electrical energy to the motor to drive the driven axle; and configured to receive electrical energy from the motor to regeneratively brake the driven axle;

a set of electrical cables configured to electrically couple the motor and the battery assembly; and a cable carrier configured to:

locate between the bogie chassis and the battery assembly;

house the set of electrical cables; and support the set of electrical cables over a range of longitudinal positions of the bogie chassis relative to the battery assembly.

* * * * *